Nov. 9, 1965 J. H. AUER, JR., ETAL 3,217,159
AUTOMATIC RETARDER CONTROL SYSTEM
Original Filed June 6, 1955 11 Sheets-Sheet 2
FIG. 3A.
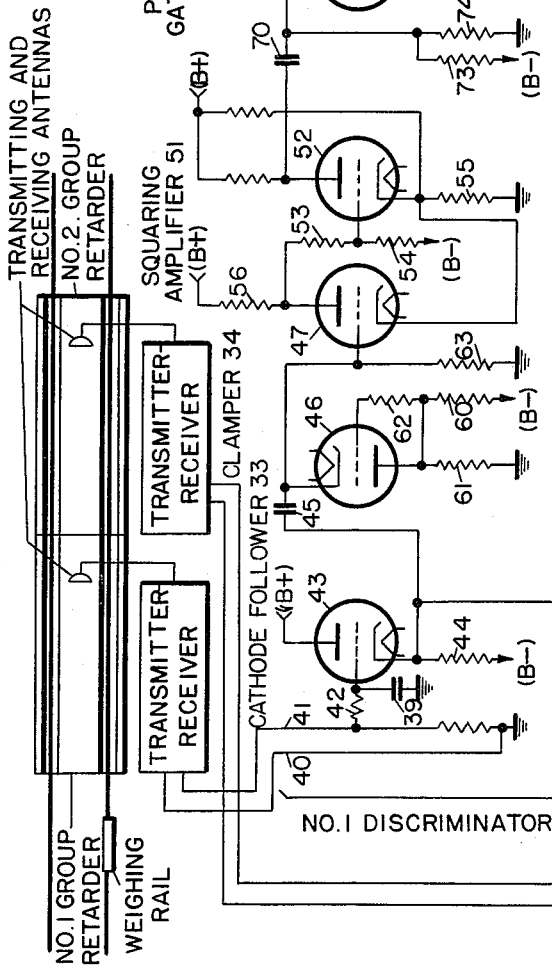
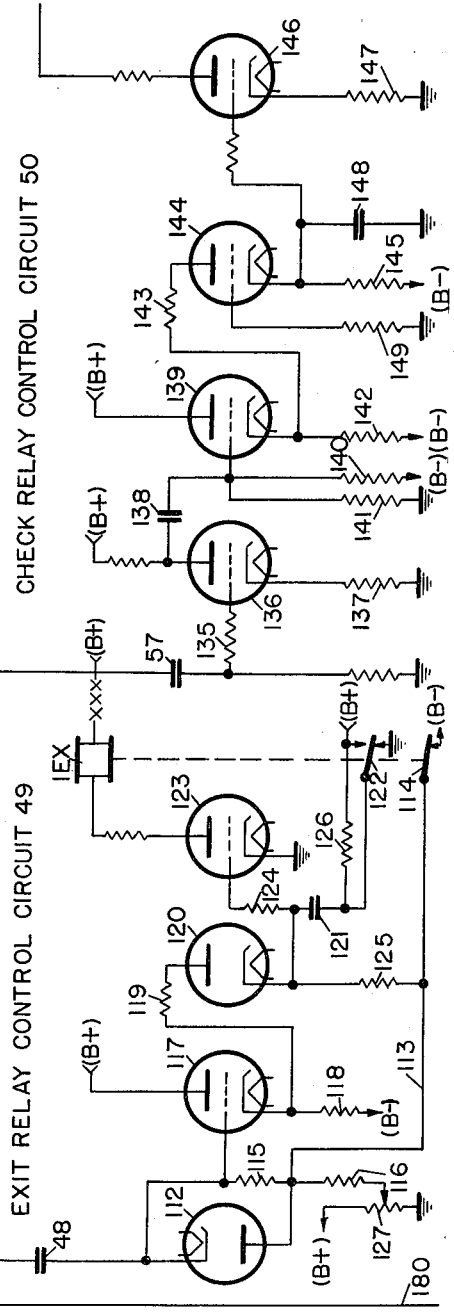
INVENTORS
J.H. AUER JR. AND
H.C. KENDALL
BY
THEIR ATTORNEY

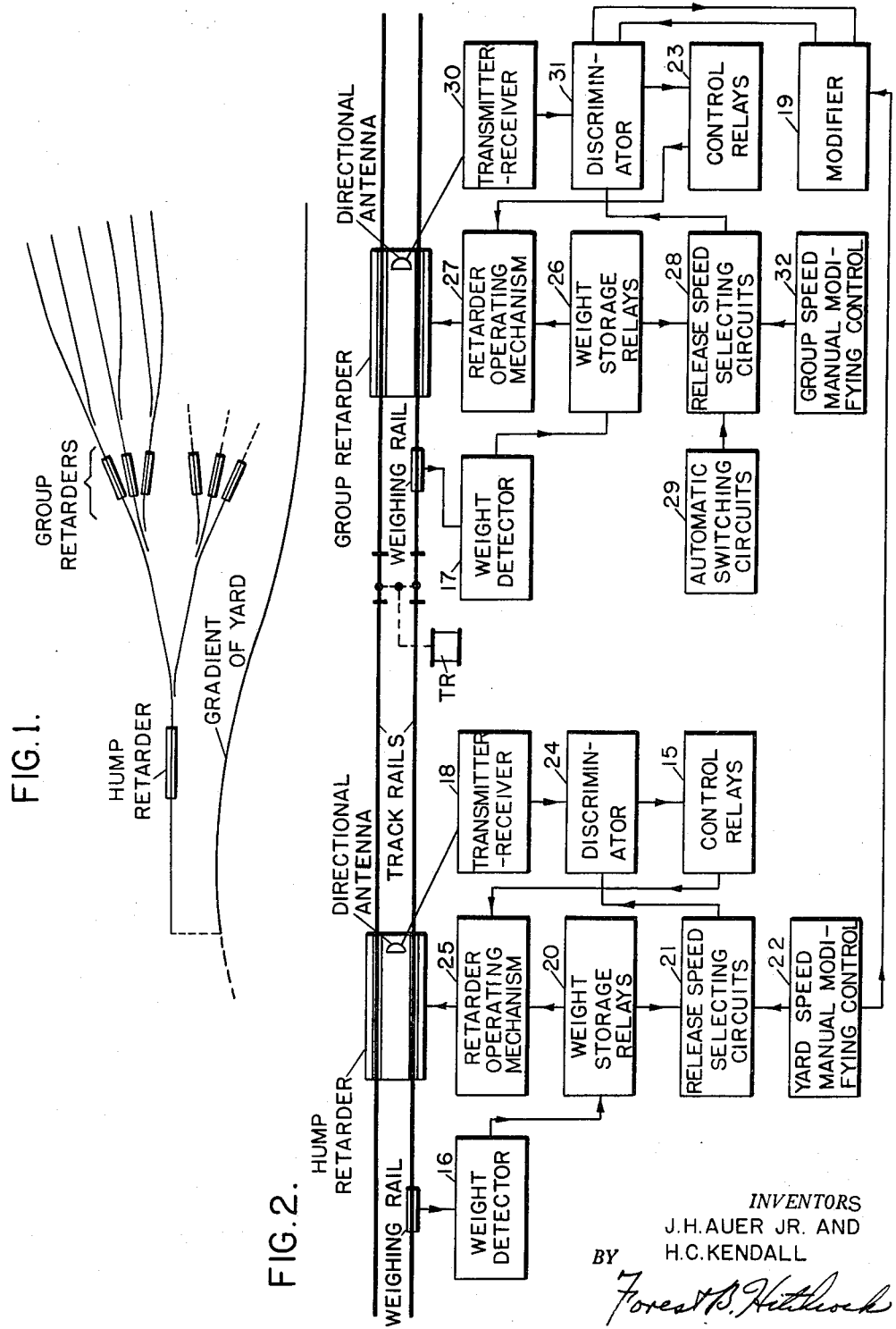

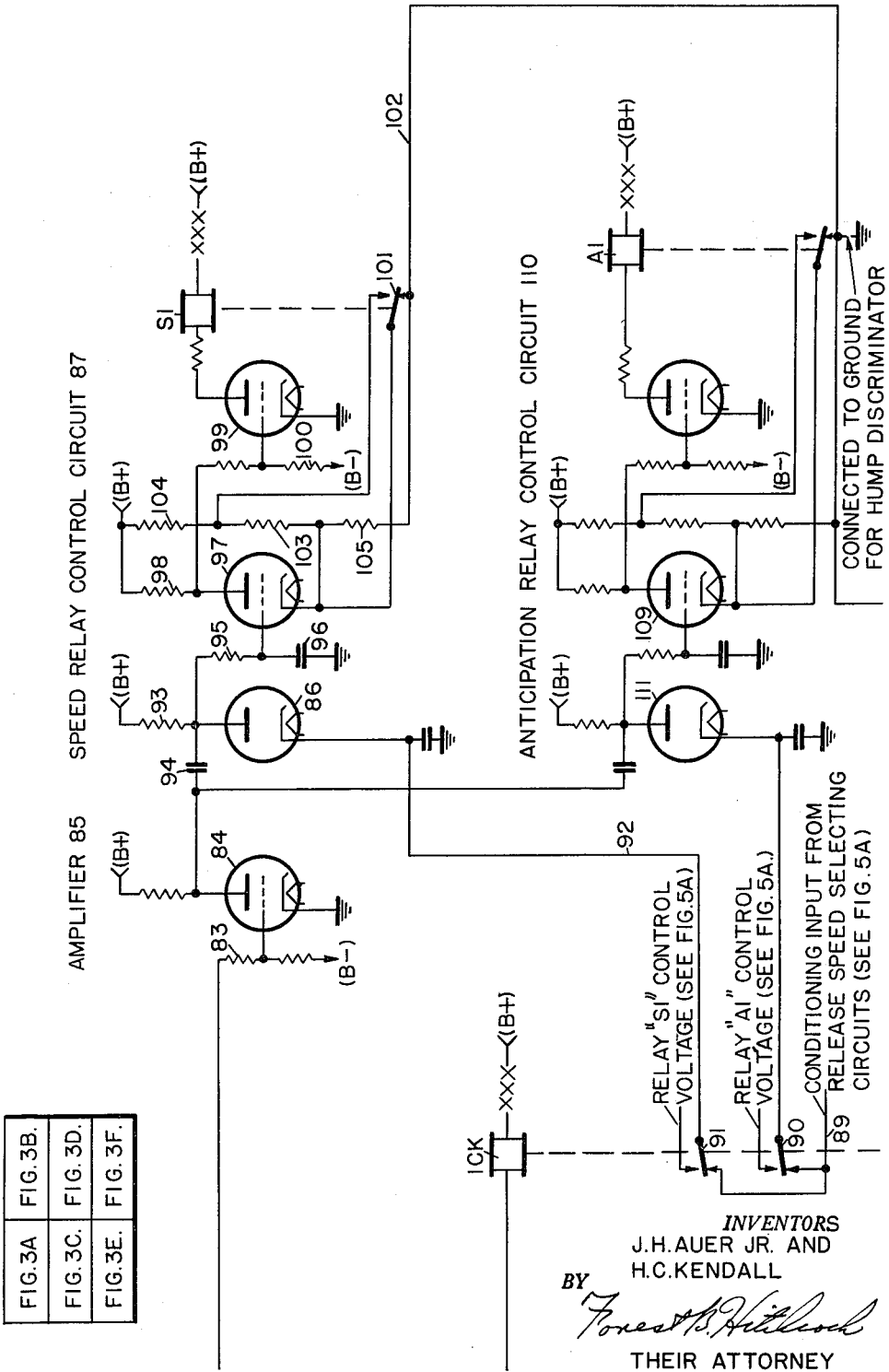

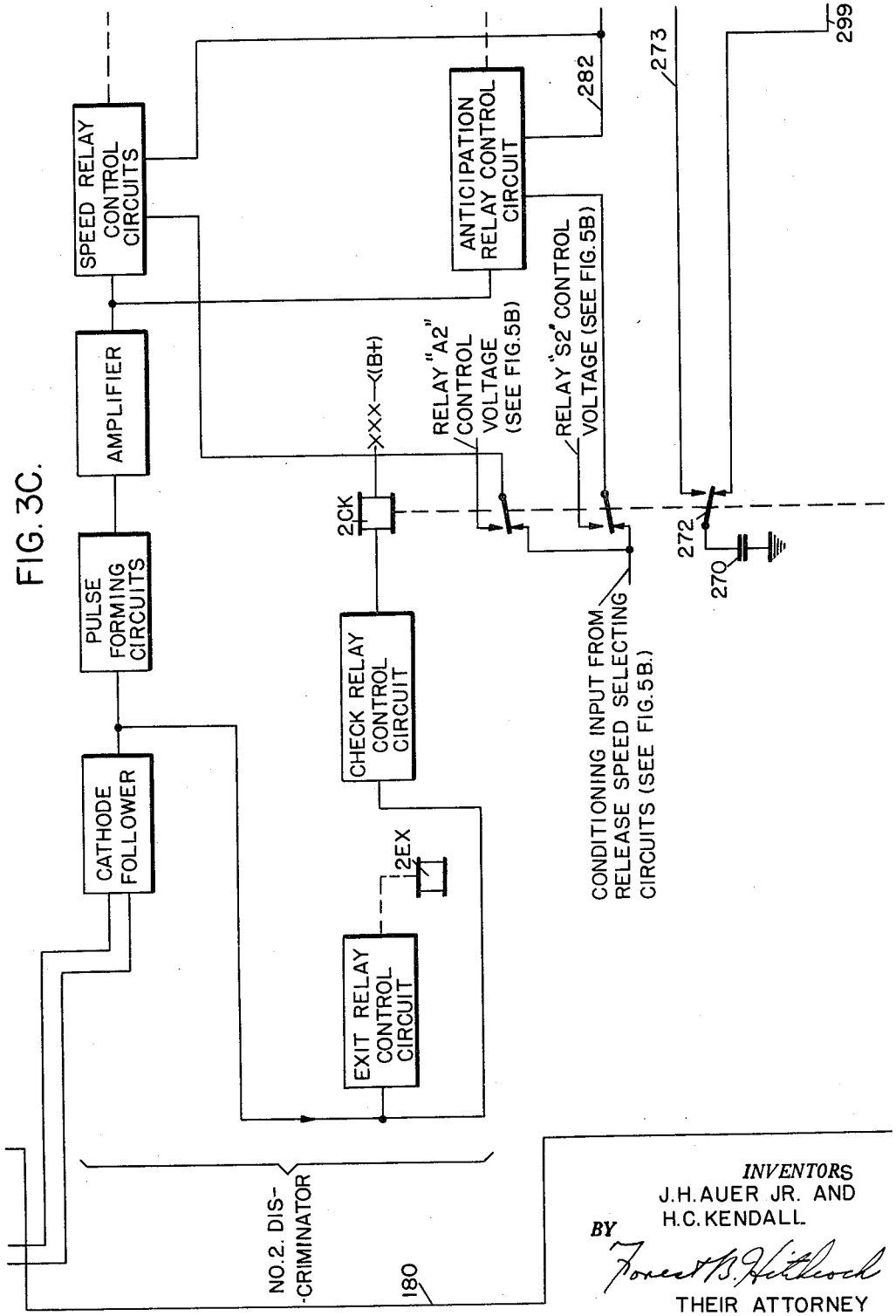

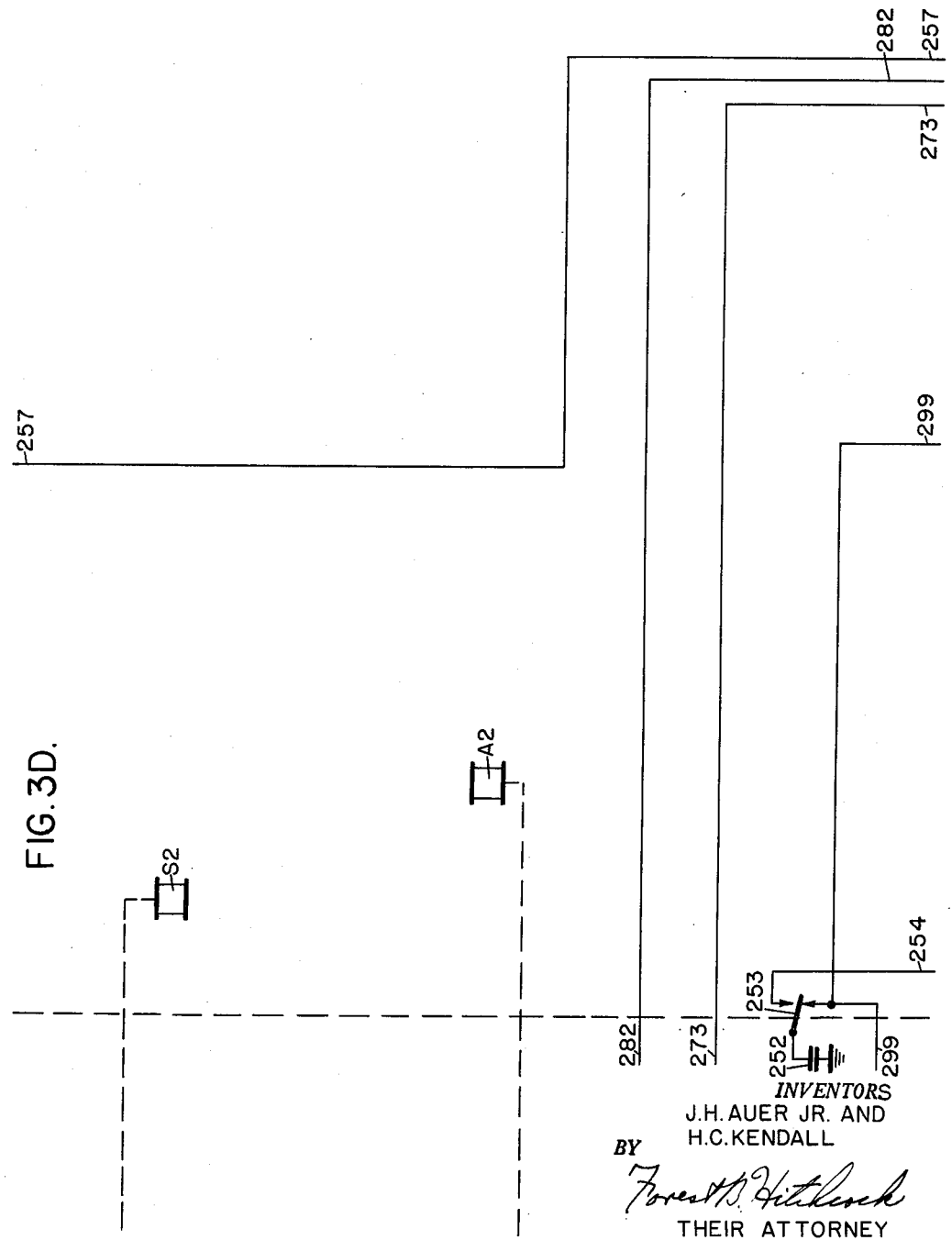

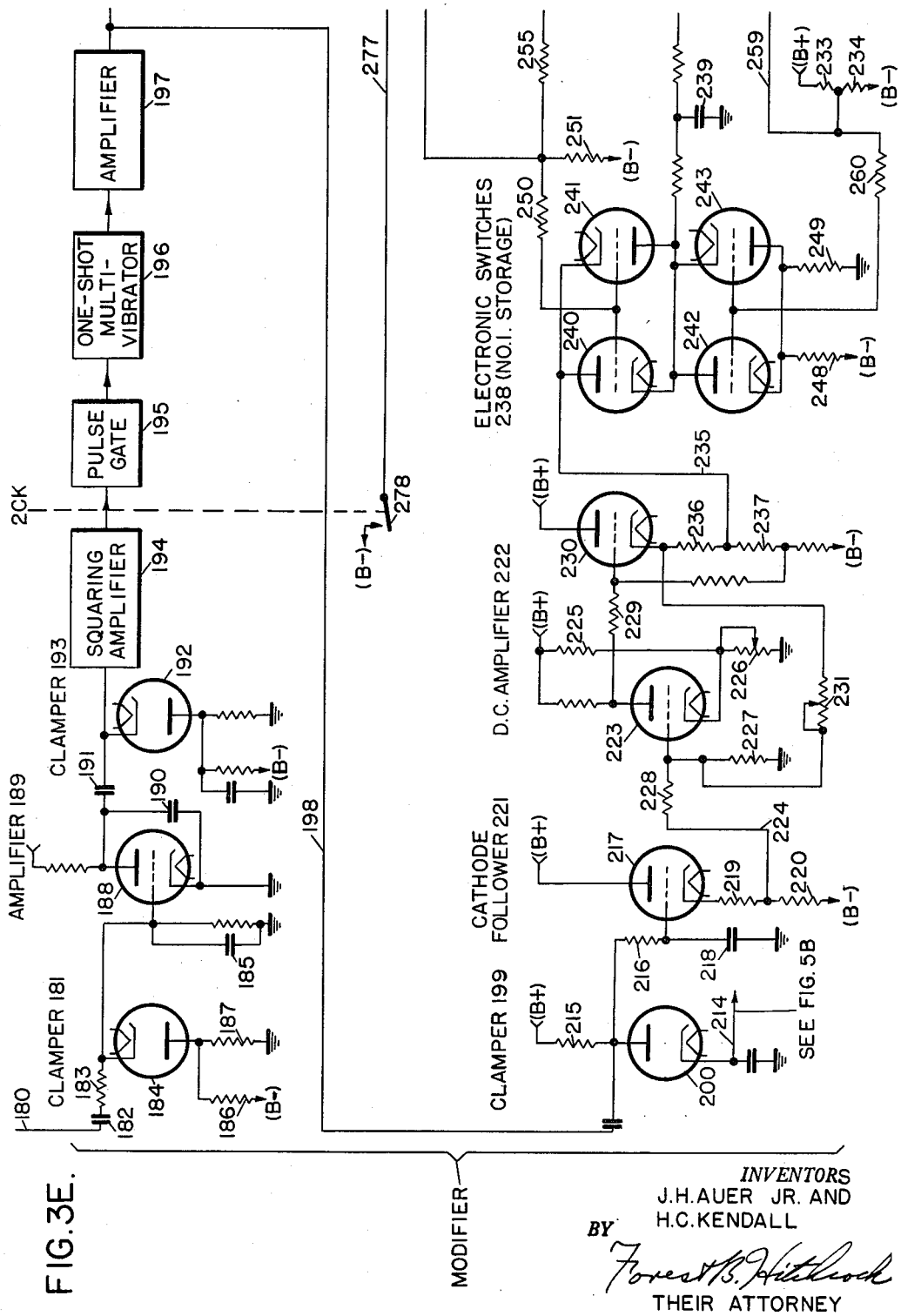

Nov. 9, 1965   J. H. AUER, JR., ETAL   3,217,159
AUTOMATIC RETARDER CONTROL SYSTEM
Original Filed June 6, 1955   11 Sheets-Sheet 7

FIG. 3F.

INVENTORS
J.H.AUER JR. AND
H.C.KENDALL
BY
Forest B. Hitchcock
THEIR ATTORNEY

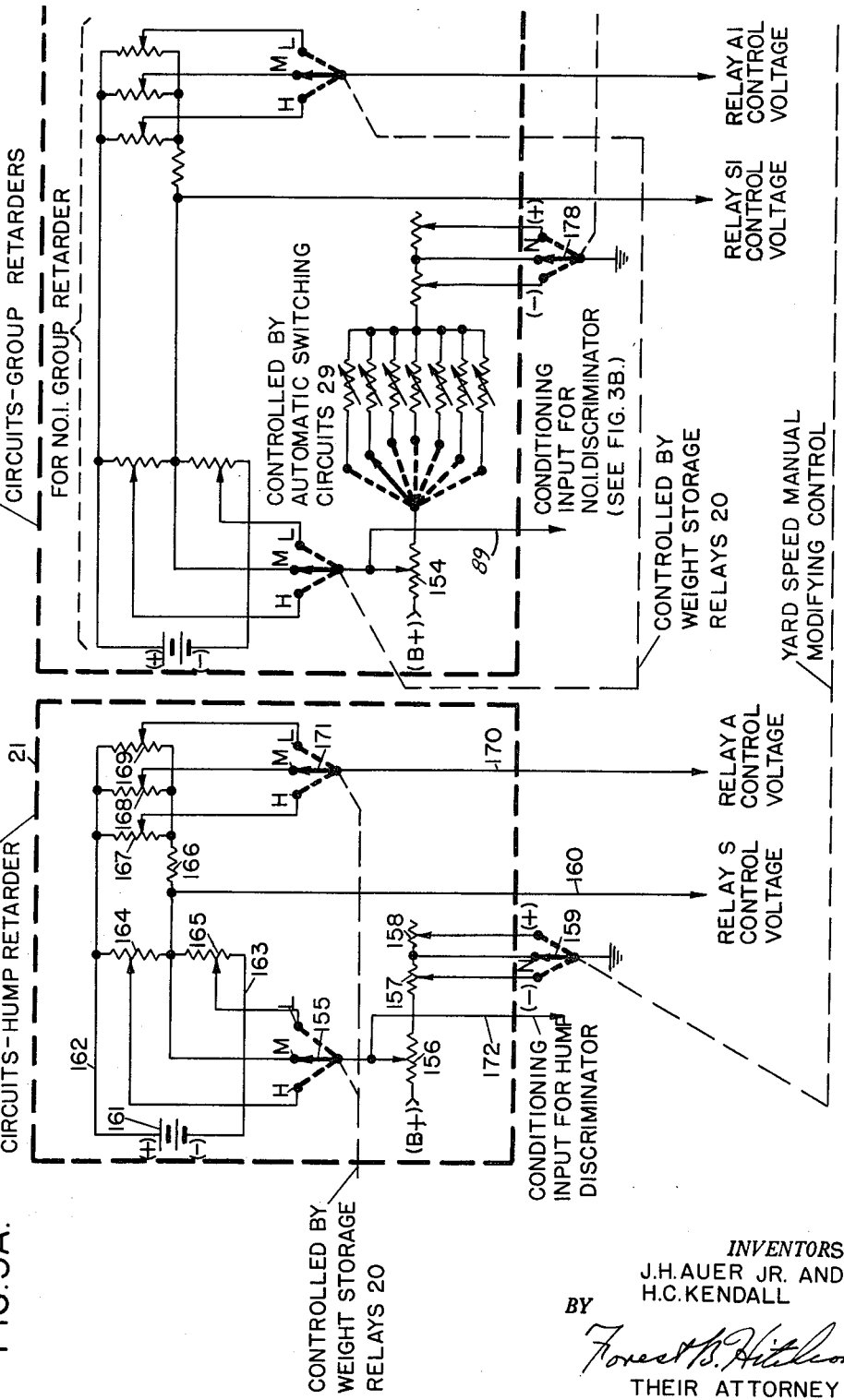

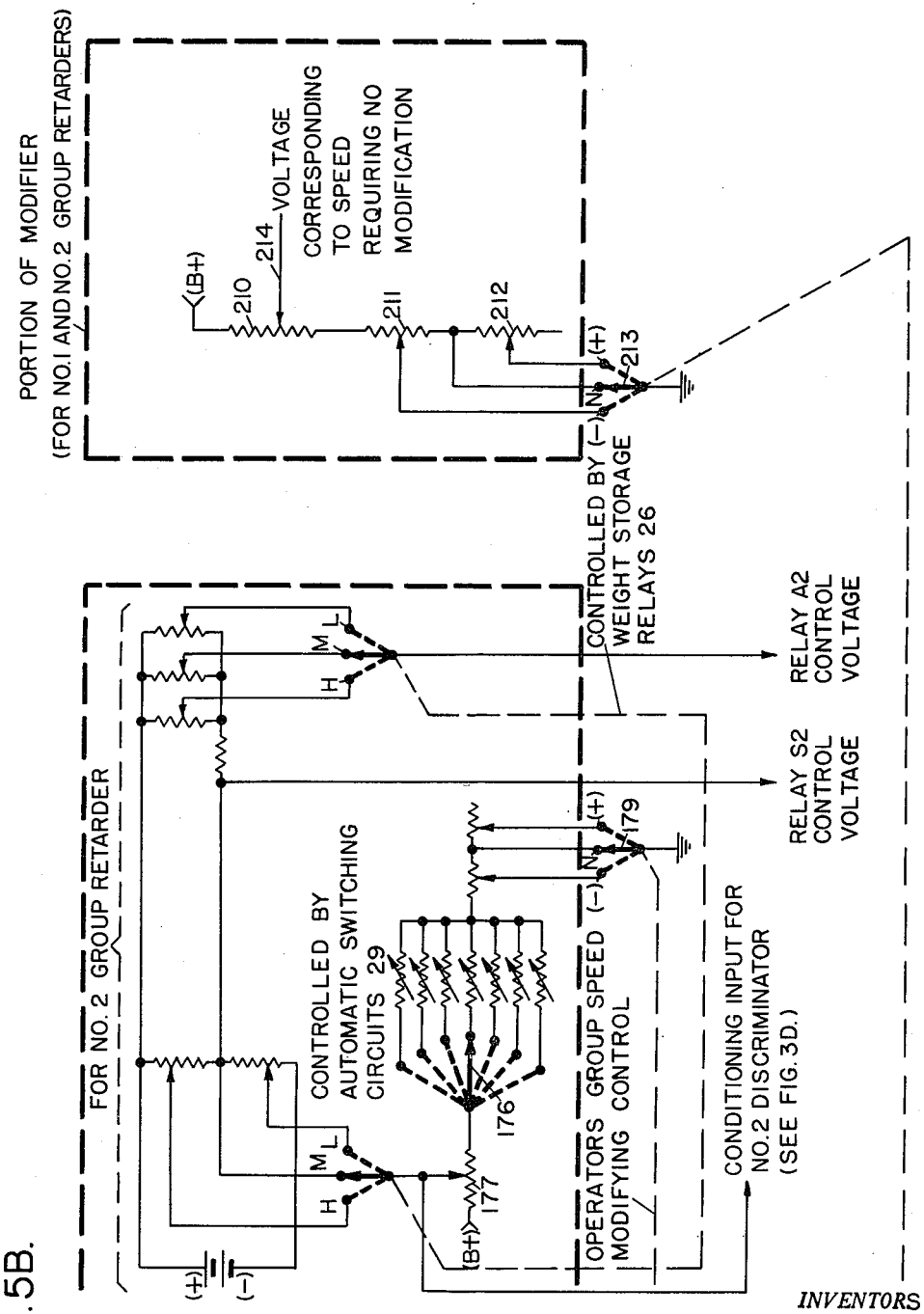

Nov. 9, 1965  J. H. AUER, JR., ETAL  3,217,159
AUTOMATIC RETARDER CONTROL SYSTEM
Original Filed June 6, 1955  11 Sheets-Sheet 10

INVENTORS
J.H.AUER JR. AND
H.C.KENDALL
BY
Forest B. Hitchcock
THEIR ATTORNEY

United States Patent Office 3,217,159
Patented Nov. 9, 1965

3,217,159
AUTOMATIC RETARDER CONTROL SYSTEM
John H. Auer, Jr., Fairport, and Hugh C. Kendall, Rochester, N.Y., assignors to General Signal Corporation, a corporation of New York
Continuation of application Ser. No. 513,364, June 6, 1955. This application Dec. 1, 1964, Ser. No. 416,958
10 Claims. (Cl. 246—182)

This application is a continuation of our prior application Ser. No. 513,364, filed June 6, 1955, now abandoned.

This invention relates to the automatic control of the speed of railway cars in a classification yard, and more particularly pertains to a system for controlling the application and release of braking pressure of track brake type car retarders to provide car coupling at suitable speeds.

In a classification yard, a train of railway freight cars is pushed over the crest of a hump, and each car is then allowed to roll by gravity down the hump and over a number of route-selecting switches to a particular one of a number of destination tracks. When several successive cars are to go to the same destination track, they are usually left coupled together and allowed to roll together to their destination track; such a group of cars is called a "cut." In this way, the cars of a train are classified according to their intended destinations.

The grade of the hump is made sufficient so that the car with the hardest rolling characteristics can reach the most remote destination in the classification yard and couple onto other cars in that same destination track. Easier rolling cars must, consequently, be decelerated so that they too will reach their destination tracks with a suitable coupling speed. This deceleration is accomplished by providing car retarders along the track rails whose brake shoe beams apply controllable braking pressure to the rims of the car wheels.

In rolling from the crest of the hump, the cars are switched from the main track to a plurality of branch tracks and then over various additional switches to their final destination tracks. One or more car retarders are located along the maintrack, and these are called "hump retarders." Additional car retarders are included in some of the branch tracks as well so that the speed of each car or cut can be controlled for the particular conditions relating to the group of tracks it will travel over, and these retarders are called "group retarders." Where conditions require it, a series of retarders rather than one is located along the track adjoining each other to provide the required amount of retardation.

In the past, it has been the practice to have the braking effect of the various retarders controlled by an operator who observes the speed of each car or cut and then takes into account the car's weight, its rolling characteristics, destination, and other factors to determine how much retardation should be applied. These many independent factors, whose value can for the most part be only roughly estimated by an operator, make it exceedingly difficult to control the retarders precisely. The retarder operator's task becomes more difficult when, as often happens, several cars or cuts are passing simultaneously through the yard over diverse routes so that they occupy different retarders at about the same time. In such a system, any misjudgment by the retarder operator results in unsatisfactory operation. A car may fail to reach its intended destination if it has been given too much retardation, or it may enter its destination track at too high a speed if it has not been given sufficient retardation and then cause damage as it couples at high speed with the other cars already in the destination track.

To overcome these difficulties, the system of this invention has been devised to control the retarders automatically so that each car leaves the group retarder at a speed that will cause it to couple in its destination track at the desired coupling speed.

Described in a general manner, the release speed for each car or cut is computed by taking into account the various factors already mentioned. Thus, the system comprises computing means which receives information for each car as to its destination track, weight, and rollability, and from this data determines what the desired releasing speed from the group retarder should be. Speed measuring apparatus is also provided and is effective to release the group retarder as soon as it has reduced the car speed to the computed value.

The factor of car rollability varies widely from car to car. However, it is an important factor in determining the acceleration or deceleration each car will experience after it leaves the group retarder so that this factor must be determined quite accurately. Car rollability is determined in the system of this invention by measuring the acceleration each car experiences as it rolls by gravity over a test section of track located between the hump and the group retarders. The hump retarder is controlled to release all cars so that they will leave this location at substantially the same speed. As each car travels downgrade toward a particular one of the group retarders, it is variously accelerated or decelerated depending on its rolling characteristics. Since all cars and cuts are assumed to leave the hump retarder at the same speed, a measurement of car velocity at the entrance to the group retarder gives a measure of average acceleration and thus also a measure of comparative rollability.

More specifically, the system provides apparatus associated with each car retarder that constantly measures the speed of any car in the retarder or immediately in approach of the retarder. This apparatus is of the continuous-wave-radar type wherein the frequency shift of a high frequency signal reflected from a moving car is, according to the Doppler principle, proportional to the car's speed. The speed measuring apparatus associated with the hump retarder is thus able to control the hump retarder so that all cars will leave this retarder at about the same speed. As each car approaches the group retarder, its speed is again determined by speed measuring apparatus associated with the particular group retarder just before the car is about to enter the retarder. From this measurement of speed, the car's comparative average acceleration and thus its comparative rollability is determined by a circuit organization called a "modifier."

The release of a group retarder results directly from the actuation of an electromagnetic relay operated by a unit called a "discriminator." The Doppler beat frequency signal proportional to car speed is applied to this discriminator, and when this beat signal reaches a certain value, indicating that the car speed has been reduced by the retarder to the desired value, the relay is actuated and the retarder released. The car speed at which the discriminator causes the relay to be actuated can be influenced by various factors. Thus, the car's weight is a variable factor which is applied as an input to the discriminator and used in determining the release speed. The particular route the car will take upon leaving the group retarder is obtained from the automatic switching circuits and this information is also used as an input factor to determine release speed. This information as to route is important because the amount of track curvature a car encounters determines to a considerable extent the restraining force effective on each car. Similarly, the comparative rollability of each car or cut is applied to another input factor from the modifier to aid in determining release speed. In addition, manually operable controls are provided so that an operator can increase or decrease the car release speeds by fixed amounts, either throughout the whole classification yard or, if he desires, at a particular group retarder location. Thus, all the various factors which affect the speed of a car after leaving the group retarder are taken into account, each with the proper weight given to it, to determine the desired release speed from the group retarder. Means is provided to make automatically ineffective the modifying affect according to the car rollability when it is detected that a long cut of cars rather than a single car is passing through the retarder.

The input data applied to the various computing circuits may be in the form of continuously variable quantities. As an example, the factor of car rollability used to modify release speed is a continuously variable quantity rather than a selected one of a limited number of discrete steps such as easy, medium, or hard rolling. Likewise, the computed release speed is a continuously variable quantity. As a result of this, it is possible to obtain a far more precise control of coupling speed than in systems wherein the retarder release speed can be only one of a selected number of values such as high, medium, or low speed.

An object of this invention is to provide a car retarder control system comprising a test section of track over which car acceleration is determined to provide thereby a measure of comparative car rollability as a continuously variable quantity for use in modifying release speed from the group retarder.

Another object of this invention is to provide a car retarder control system wherein the release speed of any car from the retarder is a continuously variable quantity to provide thereby a more accurate control over the coupling speed of cars in their destination tracks.

Another object of this invention is to provide electronic computing means which is responsive to various independent factors related to each car or cut to determine from this data the proper release speed from the group retarder.

An additional object of this invention is to provide modifier circuit means for determining comparative car rollability by comparing the speed of arrival of any car at the exit of a test section with its known entering speed at such test section.

Another object is to proivde modifier circuit means for determining comparative car rollability having electronic storage and transfer circuit means whereby computed rollability for a plurality of cars can simultaneously be stored.

Another object is to make the modifier automatically ineffective to vary release speed when it has been detected that a long cut is passing through the retarder.

Other objects, purposes, and characteristic features of this invention will in part be obvious from the accompanying drawings, and in part pointed out as the description of the invention progresses.

In describing the invention in detail, reference will be made to the accompanying drawings in which like reference characters designate corresponding parts in the separate views, and in which:

FIG. 1 diagrammatically illustrates a portion of the track layout of a typical classification yard;

FIG. 2 is a block diagram showing the general organization of the system of this invention;

FIGS. 3A, 3B, 3C, 3D, 3E and 3F when placed in relative positions shown in FIG. 4, provide a circuit diagram of a portion of the retarder control system of this invention;

FIGS. 5A and 5B, when placed side by side, illustrate a portion of the circuit organization used to measure a desired release speed for each car from the group retarder;

Figure 6:
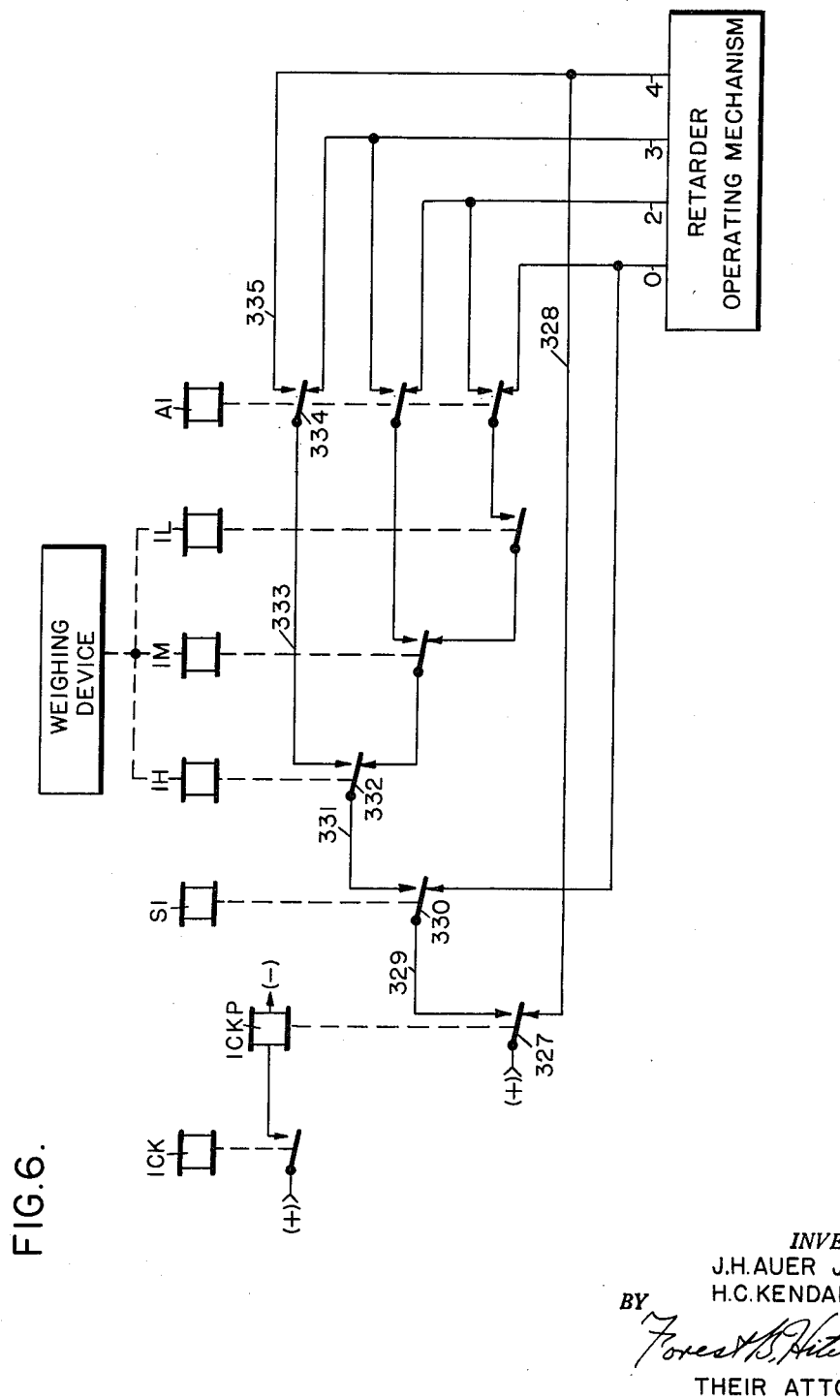
FIG. 6 illustrates a typical circuit for the control of a retarder.

To simplify the illustration and facilitate the explanation of this invention, various parts and circuits which constitute the embodiment of this invention are shown diagrammatically and certain conventional illustrations are used. The drawings have been made to make it easy to understand the principles and manner of operation rather than to illustrate the specific construction and arrangement of parts that would be used in practice. The various relays and their contacts are shown in a conventional manner and symbols are used to indicate connections to the terminals of batteries or other sources of electric current instead of showing all the wiring connections to these terminals. The terminals (B+) and (B−) indicate connections to the opposite terminals of a source of voltage suitable for the operation of various electron tubes and the like, and this source of voltage is provided with a tap between the (B+) and (B−) terminals designated by the symbol for a ground connection.

GENERAL SYSTEM ORGANIZATION

FIG. 1 illustrates a portion of a track layout in a typical car classification yard. A train of cars is pushed up the hump and then the cars are allowed to roll singly or in cuts over the various switches and branching tracks to their final desination tracks. A hump retarder is located ahead of the first switch. Additional retardation is provided by one or more group retarders located in each of the several branching tracks. The gradient of the yard is shown also in FIG. 1 to illustrate that the cars roll by gravity from the hump to their intended destination tracks.

The block diagram of FIG. 2 illustrates hump and group retarders at spaced locations along the track rails. Near the leaving end retarder and preferably between the track rails is a directional antenna which is beamed to transmit a high frequency signal towards approaching cars. The transmitter-receiver 18 associated with the directional antenna provides this high frequency signal and also is responsive to the higher frequency signal that is reflected from approaching cars. It mixes these two signals of different frequency to obtain a difference or beat frequency which is proportional to car speed. This beat frequency signal is applied to the discriminator 24 which responds to the frequency value by selectively actuating the control relays 15. Thus, the conditions of these relays provide an indication as to car speed and may thus be used to control the retarder operating mechanism.

Weighing means is provided just ahead of the hump retarder and also just ahead of each group retarder location so that the weight of each car, or the weight of the heaviest car in a cut, may be determined. The weighing means may comprise a "floating" weighing rail which has associated therewith a weight detector mechanism 16. The weighing rail selectively actuates contacts of the weight detector 16 in accordance with the extent of its deflection by the weight of a car, and these contacts, in turn, selectively actuate the weight storage relays 20. Weighing means of this kind is shown and fully described in the pending application of S. M. Phelps, U.S. Ser. No. 386,095, filed October 14, 1953, now U.S. Patent No. 2,868,534 issued January 13, 1954. Other types of weighing means may also be provided such as an electronic means comprising a strain gauge.

Other factors being equal, a heavy car passing through a retarder possesses more kinetic energy than a light car. Consequently, to slow down a heavy car the retarder must be set to provide a greater braking effect than is required for a light car. To provide this control, contacts of the weight storage relays 20 are used in a circuit organization providing for the control of the retarder operating mechanism 25 as shown in FIG. 2.

Although the apparatus associated with the hump retarder should release all cars regardless of weight from this retarder at the same speed, car weight information must still be a factor in determining at what car speed the control relays 15 should be actuated. The reason for this is that the retarder mechanism is operated to a released position as soon as the control relays 15 are actuated, but a finite time is required for the mechanism to operate to the released position. The time required is greater when the retarder has been tightly closed for a heavy car than it is when the retarder is less tightly closed for a lighter weight car. In this variable interval, some retardation is still being exerted by the retarder on the car. Therefore, a heavy weight car experiences more braking in the interval between actuation of the control relays 20 and the full release of the retarder than does a light weight car. For this reason, weight information provided by contacts of the weight storage relays 20 is supplied to the release speed selecting circuits 21 so that the computed speed at which the control relays operate can be made different for cars of different weight classes. This compensation makes it possible for cars of vastly different weights to leave the hump retarder at essentially the same speed.

This situation is further aided by releasing each retarder in stages rather than attempting to operate it at one time from a closed position to a fully open position. For this reason, the control relays include both a speed relay and an anticipation relay. When the car speed has been reduced by the retarder to a value nearly equal to its intended release speed, the anticipation relay is released, and this causes the retarder to open partially from its predetermined closed position. When the car speed is further reduced to the exact desired release speed, the speed relay is operated, and this causes the retarder to then be fully released. In this way, the retarder is not required to be operated through its entire range when the car speed has reached its desired value, with the result that the car speed at the time the retarder becomes fully released can then more nearly equal the computed desired value.

A manual control is provided so that an operator can vary over a selected range the speed at which cars will couple in their destination tracks. This control is the yard speed manual modifying control 22 which may comprise, as will later be described, a three-position switch. Operation of this switch from its normal position to either a (+) or (−) position acts upon the release speed selecting circuits 21 at the hump retarder and upon the modifier provided for each double group retarder to respectively decrease or increase the over-all releasing speeds of cars from the hump retarder and all group retarders in the classification yard.

When a car has passed from the hump retarder and is about to enter the group retarder, its weight classification is again determined by a weight detector 17 which selectively actuates the weight storage relays 26. The weight information thus provided is used to set the initial degree of retardation of the retarder control mechanism 27. Alternatively, the weight information regarding a car can be determined only at the entrance to the hump retarder and then be subsequently transferred to the particular group retarder that car will pass through.

The weight information for each car is then given to the release speed selecting circuits 28. Additional information regarding the intended route each car will take upon leaving the group retarder is supplied to the release speed selecting circuits 28 from the automatic switching circuits 29. Thus, information as to car weight and its route may be used by the release speed selecting circuits 28 to determine partially a desired release speed for the car from the group retarder, and this computed factor is supplied to the discriminator 31.

Since all cars leave the hump retarder at substantially the same speed, a car of average rolling characteristics may be expected to arrive at the group retarder at a predetermined speed. The actual speed at which the car arrives at the group retarder is measured by the beat frequency signal supplied by the transmitter-receiver 30, and is supplied to the modifier 19 and compared with the expected speed of arrival of an average car at the group retarder. The difference between this expected speed and the actual speed then provides a measure of the comparative rollability of the car. This information is supplied as a further determining factor to the discriminator 31 and further affects the speed at which the control relays are actuated.

A group speed manual modifying control 32 is provided to modify to a limited extent the release speed computed by the release speed selecting circuits 28. By operating this control, the operator is able to increase or decrease within certain limits the release speed of cars from a particular group retarder. The control effected by this modifying control 32 differs from that provided by the modifying control 22 in that it effects the retarder leaving speed only of one particular group rather than for all the retarders in the classification yard.

DETAILED CIRCUITS

Discriminator

*Pulse-forming circuits.*—At the hump retarder location, the transmitter-receiver 18 supplies a steady, high-frequency signal to a directional antenna, and receives from this antenna the signal reflected from each approaching car. This transmitter-receiver 18 also includes a mixer which mixes the outgoing and incoming signals to provide a difference or beat frequency signal proportional to car speed. This beat frequency signal is applied to the discriminator 24 which governs the control relays 15 according to car speed. The transmitter-receiver 18 can assume any of several different forms and can, for example, be of the kind shown in our copending application U.S. Ser. No. 359,161, filed June 2, 1953, now U.S. Patent No. 3,125,315, issued March 17, 1964. The directional antenna may be of the kind disclosed in our copending applictaion U.S. Ser. No. 375,192, filed August 19, 1953, now U.S. Patent No. 2,805,335, issued September 3, 1957.

The discriminator 24 provided at the hump retarder is similar to the discriminator 31 provided for each group retarder, the only exception being that the discriminator 24 is not provided with an input from an associated modifier. Thus, in describing the hump retarder discriminator 24 in detail, reference will be made to FIGS. 3A–3F which more particularly illustrate the organization provided for a double group retarder but also disclose the detailed circuits of a discriminator such as the discriminator 24.

The beat frequency signal proportional to car speed that is provided by the transmitter-receiver 18 at the hump retarder is applied to the input of a cathode follower amplifier 33 (see FIG. 3A). Since the discriminator, modifier and other units associated with a retarder may be at some distance from the transmitter-receiver, the beat frequency signal is applied over a twisted pair comprising the wires 40 and 41. Wire 41 is connected through resistor 42 to the grid of cathode follower amplifier tube 43. Wire 40 is connected directly to ground. Resistor 42 and capacitor 39 provide a low-pass filter which does not appreciably affect the beat frequency signal appearing at the grid of tube 43 but does sharply attenuate any spurious pulses tending to appear at the input of this tube. The output voltage of the cathode follower appears across the cathode resistor 44 and is applied through a capacitor 45 to the cathode of tube 46 included in clamper 34 and to the grid of tube 47 included in squaring amplifier 51. In addition, the output of the cathode follower is applied through a coupling capacitor 48 to an exit relay control circuit 49 and through coupling capacitor 57 to a check relay control circuit 50.

The use of a cathode follower for the first stage of the discriminator provides a high impedance termination for the twisted pair comprising wires 40 and 41. Since a coupling capacitor is used in the output of the transmitter-receiver, the output impedance rises with decreasing frequency. This would ordinarily tend to reduce the amplitude of the signal in the input circuit of cathode follower 33. The input impedance of cathode follower 33, however, is so high with respect to the impedance presented by the coupling capacitor that the amplitude of the input signal is substantially unaffected by frequency. This aids in improving the low frequency response to the system which is necessary since otherwise the exit relay might improperly drop away when the car speed reaches a low value and the beat frequency is correspondingly low. This erroneous actuation of the exit relay would supply a false indication of the exit of a car from the retarder. Also, in a cathode follower the cathode is always more positive than the grid and this prevents the flow of grid current. If grid current were to flow in response to strong signals, a large grid bias would develop that would tend to prevent the amplifier from responding for a time to subsequent weak signals. The absence of grid current flow with the cathode follower prevents this. The cathode follower provides the additional advantage that it has a low impedance output that is capable of driving several channels without any interaction. Thus, the pulse forming circuits and the exit and check relay control circuits 49 and 50, respectively, can readily be driven from the output of the single cathode follower 33.

The squaring amplifier 51 comprises tubes 47 and 52 which are interconnected to form what is commonly known as a Schmitt amplifier circuit. The plate of tube 47 is connected through resistor 53 to the grid of tube 52. This grid is also connected through resistor 54 to (B—). The cathode of tube 52 is connected through resistor 55 to ground and is also connected directly to the cathode of tube 47. If the grid of tube 47 is maintained at a positive potential, this tube will conduct and its plate voltage will be at a relatively low value because of the drop across plate load resistor 56. This low plate voltage results in a sufficiently low voltage at the grid of tube 52 so that tube 52 is cut off. Consequently, the plate voltage of tube 52 is substantially at the value of (B+) supply. When, on the other hand, the grid voltage of tube 47 is maintained at a low value, this tube is nonconductive so that its plate voltage is high, thereby causing tube 52 to become conductive. Under these circumstances, the plate voltage of this tube 52 is at a low value. Thus, as the grid voltage of tube 47 varies from a high level to a low level, the voltage at the plate of tube 52 similarly varies between a high level and a low level but over a considerably larger voltage range since only a few volts variation at the grid of tube 47 will produce a voltage variation at the plate of tube 52 that ranges over several hundred volts. The positive feedback connection provided by connecting the two cathodes of the tubes together causes the plate voltage of tube 52 to vary abruptly even though the input to tube 47 may vary in a more gradual manner. The result then is that the beat frequency signal appearing at the grid of tube 47 is effective to provide at the plate of tube 52 a susbtantially square wave of voltage having rapid rise and fall times.

When the grid of tube 47 is driven positively by the beat frequency signal, the voltage at the cathode of this tube becomes several volts positive with respect to ground. Thus, as the beat frequency signal reaches very high values when the car is close to the antenna, grid current limiting occurs which would tend ordinarily to produce a large negative bias voltage on this grid and thus effectively limit any subsequent weak signal. However, the forming of such a negative bias is prevented by the clamper 34. Thus, the voltage divider comprising resistors 60 and 61 connected between (B—) and ground maintains the plate of tube 46 at a fixed voltage which is several volts below ground potential. Since the grid of this tube is connected through resistor 62 to the plate, tube 46 acts as a diode. Whenever the cathode of tube 46 attempts to become more negative than the plate, conduction occurs so that the voltage at the grid of tube 47 is prevented from ever becoming substantially negative.

The rectangularly shaped pulses appearing at the plate of tube 52 are applied through capacitor 70 to the plate of triode tube 71 included in the pulse gate 72. The plate of this tube 71 is provided with a negative biasing voltage having an amplitude of several volts by being connected to the junction of resistors 73 and 74 connected between (B—) and ground. The values of capacitor 70 and resistors 73 and 74 are so chosen that these components act as a differentiating circuit. Consequently, each positive-going leading edge of the output pulses provided by squaring amplifier 51 produces a positive-going trigger pulse at the plate of tube 71. Similarly, each negative-going trailing edge causes a negative-going trigger pulse to appear at the plate of this tube.

Since the grid of tube 71 is connected through resistors 75 and 76 to (B+), the voltage at the control grid of this tube is substantially the same as that of the cathode since any attempt of the grid to be more positive results in increased grid current through resistors 75 and 76 which then tends to reduce the grid voltage.

The cathode of tube 71 is connected directly to the control grid of triode tube 77 which is interconnected with tube 78 in an organization known as a one-shot multivibrator. Tube 78 is normally in a conductive condition since its grid is connected through variable resistance 79 to (B+). Consequently, the plate voltage of tube 78 is at a relatively low level so that the grid of tube 77 is biased beyond cutoff. Thus, the cathode of tube 71 is at about the same negative potential that is applied to the plate of this tube.

Each positive-going trigger pulse at the plate of tube 71 is thus readily passed by this tube to its cathode with the result that the control grid voltage of tube 77 is momentarily driven above cutoff by each such pulse. This action results in an instant reversal of the conductive states of tubes 77 and 78. The multivibrator remains in this reverse condition for the length of time required for capacitor 80 to discharge to a level which will allow tube 78 to again become conductive. As soon as this occurs, the multivibrator is abruptly restored to its original condition with tube 78 conductive and tube 77 nonconductive.

During the interval that the multivibrator 81 is in the condition where tube 77 is conductive, the voltage at the grid of tube 77 is substantially raised in value although it is prevented from going above the grounded cathode because of the grid current that results whenever the grid attempts to go more positive than the cathode. Throughout this time, any spurious positive-going pulses that occur are effectively dissipated by this low impedance grid-cathode circuit and cannot affect the operation of multivibrator 81. Any spurious negative-going pulses that occur are blocked by tube 71 and thus are prevented from restoring the multivibrator prematurely to its original condition.

When the one-shot multivibrator 81 restores itself to its normal condition with tube 78 conductive, the voltage at the grid of tube 77 is restored to its normal cutoff value, and this action would ordinarily permit the multivibrator 81 to respond to a following positive-going trigger pulse. However, a connection is provided from the plate of tube 78 through capacitor 82 and resistor 75 to the grid of tube 71. Thus, as tube 78 is restored to a conductive condition and its plate voltage is abruptly lowered in value thereby, a negative pulse appears at the grid of tube 71 for the brief time required for capacitor 82 to discharge, and this pulse is of sufficient value to cut off tube 71. Thus, a second positive-going trigger pulse at the plate of tube 71 following immediately after the multivibrator 81 is restored to its normal condition, will not be passed by the pulse gate 72 and will not be effective to operate the multivibrator 81. The pulse gate 72 is maintained closed for a sufficiently short interval to ensure that only pulses occurring so closely spaced as to represent a spurious input will be prevented from reaching the input of the one-shot multivibrator 81. Positive-going trigger pulses that are sufficiently spaced to ensure that they represent a true input signal, representing perhaps speeds less than 18 miles per hour, are passed by the pulse gate 72 to the one-shot multivibrator 81.

Since the one-shot multivibrator 81 is operated by each positive-going trigger pulse to the condition wherein tube 78 is momentarily nonconductive and then back again to its normal condition with this tube conductive, it follows that the output voltage obtained from the plate of tube 78 comprises rectangularly shaped positive-going trigger pulses. One such pulse is produced for each cycle of the beat frequency signal so that the frequency of these pulses is directly proportional to car speed. The amplitude and duration of these pulses is however, fixed by the one-shot multivibrator 81 and is entirely independent of car speed.

These pulses are applied through a resistor 83 to the control grid of amplifier tube 84 included in the amplifier 85. The positive going pulses are thus inverted by this amplifier 85 with the result that the input to diode 86 included in the speed relay control circuit 87 comprises negative-going pulses. The upper limit of these pulses equals the (B+) supply voltage since this is the level reached by the plate of tube 84 when this tube is in its normal nonconductive condition. The lower limit of these pulses corresponds to the voltage at the plate of tube 84 when it is driven fully conductive by each positive-going pulse applied to its grid.

*Speed relay control circuit.*—The speed relay control circuit 87 thus receives negative-going voltage pulses from amplifier 85 and, irrespectively of car speed, these pulses are all of the same amplitude and width. Only their frequency varies, and this is directly proportional to car speed. The relationship between car speed and frequency is dependent upon the frequency of the signal transmitted from the directional antenna. In one embodiment of this invention, this frequency was so selected that there was a variation of approximately 7.5 cycles per second in the beat frequency for each one mile per hour variation in car speed.

The speed relay control circuit 87 receives an input control voltage that determines the particular car speed at which speed relay S1 drops away. Under normal conditions when there is no car in the retarder, the check relay 1CK is dropped away so that a nominal test control voltage, obtained from the release speed selecting circuits, as will be described, is then applied over wire 89 and through back contact 91 of relay 1CK to wire 92 and hence to the cathode of diode 86. When a car enters the retarder, the check relay 1CK is energized, as will later be described, so that its front contact 91 closes. Then the actual control voltage for relay S1 is applied to wire 92 through this front contact. This control voltage represents a computed voltage as determined by the release speed selecting circuits and controls the particular car speed at which the speed relay S1 will drop away.

In one embodiment of this invention, the relationship between beat frequency and control voltage values is such that a volt is equivalent to one cycle per second, while approximately 7.5 cycles per second represents one mile per hour of car speed as previously stated. As an example, the speed relay control circuit 87 receives negative-going pulses at a frequency of approximately 60 cycles per second for a car speed of eight miles per hour. If the release speed selecting circuits have determined that the speed relay S1 should drop away at a car speed of eight miles per hour, a voltage of approximately sixty volts (one volt for each cycle) is applied to the cathode of diode 86. The speed relay control circuit 87 is then so organized that the relay S1 drops away when the beat frequency reaches a value of approximately sixty cycles per second (at 8 m.p.h.) to match the control voltage input of the same value.

The plate of diode 86 included in the speed relay control circuit 87 is connected through resistor 93 to (B+); therefore, the voltage at the plate of this tube tends to rise to the (B+) level. However, it cannot rise substantially above the level of the control voltage applied to the cathode of diode 86 since any attempt of the plate to rise appreciably above this level results in conduction with an increased voltage drop across the plate resistor 93. Thus, the plate voltage of diode 86 rests normally at a voltage only slightly above that applied to the cathode.

The negative-going rectangularly-shaped pulses of constant width and amplitude appearing at the plate of tube 84 are applied through capacitor 94 to the plate of diode 86 and cause the voltage at the plate of diode 86 to decrease by a corresponding amount for each negative-going excursion. Thus, negative-going voltage pulses appear at the plate of diode 86. Now, however, the upper level of each pulse is fixed as being just slightly above the level of the control voltage. Although their width and amplitude are still constant, their average value is now determined by the control voltage which sets their upper base line. Thus, with a high value of control voltage, the pulses have a high average value since their upper level is then at a high value. Similarly, a low value of the control voltage causes the pulses at the plate of diode 86 to have a low average value since their upper level is then at a lower value.

These negative-going pulses at the plate of diode 86 are applied to an intergrating circuit that comprises resistor 95 and capacitor 96. Under normal conditions, when no car is present from which to reflect the transmitted signal, triode tube 97 is fully conductive since its grid is connected to the plate of diode 86, and this plate is steadily positive when it is not receiving negative pulses from amplifier 85. The resultant large voltage drop across plate resistor 98 of tube 97 then results in a relatively low voltage at the plate of this tube. This low voltage is unable to overcome the negative bias provided by the connection of the grid of tube 99 through resistor 100 to (B−) so that tube 99 is cut off and relay S1 included in its plate circuit is dropped away. Under these circumstances, the cathode of tube 97 is connected through back contact 101 of relay S1 to wire 102, and, since no modifier is associated with the hump discriminator, wire 102 is connected to ground as shown in FIG. 3B.

The negative-going pulses at the plate of diode 86 charge the integrating capacitor 96 negatively. The higher their frequency, the less that capacitor 96 can discharge between successive pulses; consequently this capacitor becomes negatively charged to an amount directly dependent on the frequency of these negative pulses. The negative charge on capacitor 96 is, of course, also a function of the average or D.C. level of these pulses. When their average value is high they are less able to produce a negative charge on this capacitor than when they are of low average value. Thus, the smaller the control voltage applied to the cathode of diode 86, the lower the average value of the pulses at the plate of this tube, and the greater the negative charge on capacitor 96.

Since the charge on the integrating capacitor 96 is thus dependent on pulse frequency and value of control voltage, it is possible to balance the two so that tube 97 will just verge on the condition of conductiveness. In other words, for each value of control voltage directly affecting the average value of the pulses, there is a corresponding frequency of these pulses such that the average charge on capacitor 96 is just sufficient to allow tube 97 to conduct. When the pulse frequency is increased but with the control voltage remaining the same as compared to the balance condition, capacitor 96 receives more negative charging pulses in any given period of time and so assumes a more negative average charge, causing tube 97 to be driven beyond cutoff. Similarly, maintaining the pulse frequency, but lowering the control voltage causes pulses at the same rate but of a lower average value to charge capacitor 96 so that its average charge again becomes more negative. On the other hand, a reduction in the pulse frequency, or alternatively, an increase in the control voltage causes capacitor 96 to be charged less negatively so that tube 97 then becomes conductive. Consequently, for any value of control voltage applied to the cathode of diode 86 and representing a corresponding car speed, there is a pulse frequency at which the balanced condition occurs with tube 97 verging on the conductive condition, and it is at this car speed that relay S1 drops away to thereby actuate the retarder mechanism to its nonbraking position. For higher car speeds, the pulse frequency is greater, capacitor 96 is more negatively charged, tube 97 is cut off, tube 99 is conductive, and relay S1 is picked up. For lower car speeds, the opposite conditions prevail, and relay S1 is dropped away.

A circuit organization is provided in this speed relay control circluit 87 comprising a contact 101 of relay S1 that tends to provide a more positive and sure operation of relay S1. Thus, when relay S1 is in its picked up condition, its front contact 101 is closed so as to short-circuit resistor 103. This resistor is included in a voltage divider comprising resistors 104, 103 and 105 connected between (B+) and wire 102 which is connected to ground at the hump discriminator as shown in FIG. 3B. When the car speed reaches a value that results in the deenergization of relay S1, the opening of front contact 101 removes the short-circuit on voltage dividing resistor 103. Consequently, the voltage at the cathode of tube 97 is somewhat reduced in value because of the additional resistance then effective in the voltage dividing circuit between the cathode of tube 97 and (B+). Since the deenergization of relay S1 resulted from an increase of voltage at the grid of tube 97 tending to make this tube conductive, the drop of cathode voltage of this tube resulting from the opening of front contact 101 of relay S1 provides, in effect, a positive feedback so that the grid-cathode potential is abruptly increased and tube 97 is abruptly made even more conductive. This action hastens the cutting off of tube 99 so that relay S1 is more quickly deprived of energizing current and very qiuckly drops away. The opposite conditions prevail when relay S1 picks up. Under these circumstances, the cathode of tube 97, which has been connected through back contact 101 of relay S1 to the grounded wire 102, is then immediately raised in potential when back contact 101 opens. With this rise in potential on the cathode of tube 97, this tube is abruptly made nonconductive. As a result, the current through tube 99 is quickly increased so as to pick up relay S1 more rapidly. In this way, the circuit organization provides that the relay will not hesitate in its operation but will instead operate positively.

*Anticipation relay control circuit.*—The anticipation relay control circuit 110 operates in exactly the same way as has been described in connection with the speed relay control circuit 87. The only difference is that the control voltage applied to the cathode of diode 111 is of a somewhat higher value so that the anticipation relay A1 will drop away for a slightly higher car speed than does the speed relay S1. In the normal mode of operation, therefore, both anticipation and speed relays A1 and S1, respectively, are in picked-up conditions as a car enters the associated retarder. As the car is decelerated, its speed eventually reaches a particular value where the beat frequency in cycles per second equals the number of volts applied to the cathode of diode 111 in the anticipation relay control circuit 110. When this happens, the anticipation relay A1 drops away and causes the retarder to be partially released. When the car speed is reduced still more, the beat frequency becomes finally equal to the number of volts impressed on the cathode of diode 86 in speed relay control circuit 87. At such time, the speed relay S1 drops away with the result that the retarder is operated to a fully released position.

*Exit relay control circuit.*—The exit relay control circuit 49 is effective to control the operatioin of an exit relay 1EX in accordance with the amplitude rather than frequency of the beat frequency signal. Thus, the operation of this exit relay is a function of the proximity of the car to the transmitting antenna and is independent of the actual car speed. This control circuit 49 is so adjusted in its operation that the exit relay picks up only when the reflected signal is of a relatively large amplitude, indicating that the car is within the retarder mechanism. As the car passes over the transmitting antenna, the reflected signal reaches its maximum amplitude; but once the car has passed further along and begins to recede from the antennna location, the reflected signal drops abruptly in its amplitude. By placing the antenna some slight distance up from the leaving end of the retarder, the reflected signal reaches a sufficiently low value to drop the exit relay when the last truck of the car is just about to leave the retarder. Thus, the dropping away of the exit relay supplies an indication regarding the car's leaving of the retarder. This information can then be used to transfer weight or other information to other locations as will be described subsequently.

The exit relay control circuit 49 receives the beat frequency signal directly from the cathode of the cathode follower tube 43. This beat signal is applied through capacitor 48 to the cathode of diode 112. The plate of diode 112 is normally connected over wire 113 and through back contact 114 of relay 1EX to (B−). The cathode is connected through resistor 115 to the plate and thus also to this source of negative voltage. Normally, when no signal is being received, there can be no current through resistor 115, and with no voltage drop across this resistor, both plate and cathode of diode 112 must be at the voltage of the (B−) source.

When a beat frequency signal is received from the cathode follower tube 43, the voltage at the cathode of diode 112 varies in accordance with this beat frequency signal but its lower limit is clamped to the level of the (B−) source of voltage. More specifically, the received beat frequency signal cannot cause the voltage at the cathode of diode 112 to become more negative than the (B−) voltage applied directly to the plate since this would cause the diode to become conductive. Thus, the base line of the voltage at the cathode of diode 112 is at the level of the (B−) voltage source and the voltage goes positive from this base line by an amount equal to the peak-to-peak value of the beat frequency signal.

Triode tube 117 is connected to operate as a cathode follower, having its plate connected directly to (B+) and its cathode connected through the load resistor 118 to (B−). The input signal applied to the grid of this tube thus appears also at the cathode and is applied through resistor 119 to the plate of the rectifying diode 120. In the absence of an input signal, a negative voltage appears at the cathode of tube 117 and also at the plate of tube 120. Since the cathode of tube 120 is connected through resistor 125 and back contact 114 to (B−), this cathode is at a negative potential and causes capacitor 121 to charge with a polarity that makes its upper terminal negative with respect to ground. The rectified signal appearing at the cathode of diode 120 discharges capacitor 121 which is connected from this cathode and through back contact 122 of relay 1EX to ground. Capacitor 121 thus is charged in accordance with the envelope of the positive portion of the beat frequency signal. As the car comes closer to the antenna, the reflected signal increases in amplitude and the charge on capacitor 121 correspondingly becomes less negative.

Since the relay control tube 123 normally has its control grid connected through reisstors 124 and 125 to (B—), this tube is normally biased to a cutoff condition so that relay 1EX is dropped away. However, when the beat frequency signal becomes of sufficient amplitude to charge capacitor 121 to a high positive potential, the cutoff bias for tube 123 is finally overcome so that this tube becomes conductive and relay 1EX then picks up.

When relay 1EX is picked up by a beat frequency signal of large amplitude, it must not flutter nor drop away immediately thereafter if the reflected signal should momentaritly experience a decrease in amplitude since any dropping away of relay 1EX is an indication that a car has left the retarder. For this reason, the exit relay control circuit 49 is organized so that the first momentary opening of the back contact of this relay when the car enters the retarder results in an immediate over-energization of the relay winding so that it will quickly close its front contacts. In addition, a strong energization of the relay winding is provided for a limited time thereafter so that the relay is held energized irrespective of the then existing amplitude of the beat frequency signal. Consequently, any dip in amplitude of the beat frequency signal occurring just after the relay has picked up cannot be effective to cause its release.

More specifically, the capacitor 121 normally has its lower terminal connected through back contact 122 of relay 1EX to ground. As already described, therefore, this capacitor must be positively charged by the beat frequency signal a sufficient amount so that tube 123 can become conductive and energize relay 1EX. However, as soon as the back contact 122 of relay 1EX is opened, the lower terminal of capacitor 121 is disconnected from ground and is instead connected through resistor 126 to (B+). There is then an immediate increase of voltage at the lower terminal of this capacitor and also at its upper terminal since a capacitor cannot change its charge instantly. The grid of tube 123 thus experiences an abrupt increase of voltage that tends to provide a very strong energization of the winding of relay 1EX.

Very soon after, front contact 122 closes and connects the lower terminal of capacitor directly to the (B+) source. The further increase of voltage on the lower terminal of capacitor 121 that then results provides a further increase on the grid of tube 123. This voltage increase persists for the length of time required for capacitor 121 to charge. In one embodiment of this invention, the circuits constants were so chosen that the charging of capacitor 121 through the front contact 122 of relay 1EX maintained tube 123 fully conductive for an interval of one second regardles of the signal strength existing for that one second interval. After this one second interval, the car is sufficiently closer to assure that the signal is of such a high value (130 volts peak-to-peak perhaps) that it can hold the exit relay 1EX fully energized.

The picking up of the exit relay 1EX is also effective to open back contact 114 which normally connects wire 113 to the (B—) terminal. When this happens, the plate of the clamping diode 112 is no longer connected to (B—) but is instead connected through resistor 116 to the tap on potentiometer 127 between (B—) and ground. The voltage that is then applied to the plate of diode 112 is substantially less negative than that normally present on wire 113; consequently, the base line of the input signal is no longer clamped at such a low value. The grid of the cathode follower tube 117 then has its input voltage going to a much higher level with the result that the grid of the relay control tube 123 is also driven with a much higher amplitude of signal. This further tends to ensure that the relay 1EX will be fully energized when the back contacts of relay 1EX open. The adjustment of the voltage provided by the potentiometer 127 determines at what amplitude of signal level the exit relay shall drop. This is selected by experimentation to the proper value so that the exit relay will drop with the level signal ordinarily received as a car leaves the retarder mechanism.

*Check relay control circuits.*—The check relay control circuit 50 operates the check relay 1CK in accordance with the amplitude of the beat frequency signal rather than its frequency. In this respect, it is similar to the exit relay control circuit 49 with the exception that the exit relay is specifically controlled to drop away when the car leaves the retarder whereas the check relay 1CK is operated to be picked up throughout the time that a car is in the retarder and is thus organized to respond to lower signal levels such as perhaps only one volt R.M.S.

The beat frequency signal obtained from the output of cathode follower tube 43 is applied through coupling capacitor 57 and resistor 135 to the control grid of amplifier tube 136. This tube is operated as a class A amplifier by reason of the cathode bias provided by the flow of current through the cathode resistor 137. The resulting amplified beat frequency signal appearing at the plate of this tube is then applied through coupling capacitor 138 to the control grid of a cathode follower tube 139. This tube is provided with a substantially negative control grid voltage by the connection of its grid to the junction of voltages dividing resistors 140 and 141 connected between (B—) and ground. The cathode of this tube is connected through the load resistor 142 also to (B—), and thus normally rests at a voltage slightly positive with respect to the grid because of the voltage drop across output resistor 142. Tube 139 may have its grid biased, in the absence of a signal, to 25 volts below ground. The cathode of this tube and also the plate and cathode of tube 144 are then only a few volts less negative than this. Since the cathode of the relay control tube 146 is grounded through resistor 147, the negative voltage normally present at the grid of this tube causes it to be cut off so that relay 1CK is dropped away.

The beat frequency signal appearing at the grid of cathode follower tube 139 varies above and below the negative bias voltage; the output signal appearing at the cathode and applied through resistor 143 to the plate of triode tube 144 thus also varies above and below a direct-current voltage that is substantially negative with respect to ground.

The cathode of tube 144 is connected through resistor 145 to (B—) so that the voltage at the cathode would ordinarily tend to be at the (B—) level. However, the plate voltage of tube 144 although negative with respect to ground is still substantially positive with respect to the (B—) source because of the cathode follower operation of tube 139. The grid of tube 144 is connected to ground through resistor 149 so that it tends to be positive with respect to the cathode but is prevented from rising substantially above the cathode as a result of grid current limiting. Consequently, tube 144 is conductive and the resulting flow of current through resistor 145 tends to maintain the cathode of this tube at a voltage only slightly below that at the plate. Grid resistor 149 is chosen to have a large enough value of resistor so that only a very slight amount of grid current can flow, not enough to appreciably raise the cathode voltage of this tube. Thus, in the absence of any signal, capacitor 148 connected between the cathode of tube 144 and ground is charged negatively by the amount of voltage present normally at the cathode of this tube, and this negative voltage provides a cutoff bias for the relay control amplifier tube 146 so that relay 1CK is dropped away.

When a car approaches the retarder, the reflected signal results in the application of an input signal to the check relay control circuit 50. As already explained, this signal appears at the cathode of cathode follower tube 139 and varies above and below the normal negative voltage appearing at the cathode of this tube. This signal is, in effect, rectified by tube 144 since it is only on each positive-going half cycle of the beat frequency signal that the plate of tube 144 is driven positively with respect to the cathode to thereby produce an increase in cathode potential and make the charge on capacitor 148 less negative.

As the beat frequency signal increases in amplitude, the plate and thus also the cathode of tube 144 are driven more positive on the positive-going half cycles until finally the charge on capacitor 148 causes the cutoff bias provided for tube 146 to be overcome. When this occurs, plate current flows through the winding of relay 1CK to pick this relay up although, as diagrammatically illustrated by the X's in FIG. 3B, the picking up of this relay is dependent upon the closure of certain other contacts in a manner to be described.

Although the beat frequency signal may reach an extremely large value as compared with that required to pick up relay 1CK, capacitor 148 is prevented from charging to an excessive value. If such excess charging of this capacitor were not prevented, it would require too long a time for it to discharge after a car had left the retarder and, as a result, the check relay would then be maintained energized for too long an interval. To prevent this, the circuit organization is organized so that the check relay will have drop-away characteristics that are independent of the amplitude of the beat frequency signal. This is accomplished by the cutting off of the amplifier tube 144 when the beat frequency signal reaches a very large value. As the cathode of tube 144 becomes more and more positive with the continued increase of beat frequency signal, there finally comes a time when the cathode becomes positive with respect to the control grid which is connected to ground. When this occurs, tube 144 begins to cut off so that the capacitor 148 is prevented from being further charged. Thus, there is a limiting value of the charge which can be placed on capacitor 148 regardless of the size of the input signal. This limitation tends to produce a uniform manner of operation for relay 1CK since the time required for capacitor 148 to discharge to the level where tube 146 becomes cut off and drops relay 1CK is then substantially uniform for all conditions of signal strength.

*Release speed selecting circuits*

FIGS. 5A and 5B illustrate the release speed selecting circuits provided for the hump retarder and also for the two group retarders at a double group retarder location.

The function of the release speed selecting circuits provided for the hump and the group retarders is to provide control voltages to the corresponding discriminators to designate thereby at what car speed the anticipation and speed relays should be released and thus control the associated retarder first to a partially open and then a fully open condition. To accomplish this, the release speed selecting circuits include sources of voltage, potentiometers, resistors, and circuit-selecting contacts of a plurality of relays. In each case, the circuits provide an output voltage for the anticipation relay control circuit that is proportional to the desired car speed at which this relay should release and thereby partially open the retarder. Another output voltage is provided for the speed relay control circuit and is similarly proportional to the slightly lower car speed at which this relay should release and fully open the retarder. As will be better understood when the modifier unit 19 is described, the discriminators provided for the various group retarders are further subject to a control from the modifier 19 which provides an additional factor affecting release speed.

Although all cars are intended to leave the hump retarder at the same speed, the release speed selecting circuits must take into account car weight so that both speed and anticipation relays for the hump discriminator will be actuated at slightly different car speeds for different weight classifications. This is done to compensate for the different amounts of acceleration that cars of different weights experience during the short interval between dropping away of the speed relay and the actual releasing of the retarder mechanism as has been explained. For this reason, the release speed selecting circuits 21 for the hump retarder (see FIG. 2) comprise circuit selecting means controlled by the weight storage relays 20. These relays are selectively actuated by the weight detector 16 which is, in turn, actuated by the car wheels. This control provided by the weight storage relays is diagrammatically illustrated for convenience in FIG. 5A by a three-position switch 155 which may be operated to any one of three different positions, H, M, or L designating cars of heavy, medium, and light weight classification, respectively.

The release speed selecting circuits for the hump retarder shown in FIG. 5A comprise a voltage dividing circuit organization extending from (B+), through the potentiometer 156, and the two potentiometers 157 and 158. The junction of the two potentiometers 157 and 158 is connected to the middle of three taps on switch 159 which has its heel connected to ground. The movable taps on the potentiometers 157 and 158 are respectively connected to the two remaining switch taps of switch 159 designated (−) and (+) respectively. Normally the three-position switch 159 is in its center position on the tap marked N so that the junction of the two potentiometers 157 and 158 is connected to ground. A voltage divider is thus formed that causes a particular value of voltage to appear on the movable tap of potentiometer 156 with the value of this voltage depending upon the position of this tap. For a car detected as being a medium weight classification, the three-position switch 155 has its movable contact in the center or M position, thereby connecting the movable tap of potentiometer 156 directly to the output wire 160. Thus, the voltage appearing on the movable tap of potentiometer 156 is the speed relay S1 control voltage for the hump discriminator for medium weight cars. Potentiometer 156 may be adjusted so that this voltage will be of the proper value to give the desired release speed, e.g., equal to approximately 7.5 times the desired car speed in m.p.h. in the previously described embodiment of this invention.

As shown in FIG. 5A, a source of direct voltage represented by the battery 161, is connected across the wires 162 and 163 so as to make wire 162 positive with respect to wire 163. Since the two potentiometers 164 and 165 connected in series between the wires 162 and 163 each have between their outer terminals the same resistance, their junction may be considered as being at the mid-tap point of the battery 161. The fixed resistor 166 is in series with the three parallel-connected potentiometers 167, 168, and 169, and this combination is connected across the upper potentiometer 164. Consequently, the tap on the potentiometer 168 is at a somewhat higher voltage than is the junction of the two potentiometers 164 and 165 so that, for a car of medium weight classification, the voltage on the tap of potentiometer 168 and appearing also on wire 170 is slightly above that on wire 160. The relay A1 control voltage that is then supplied to the associated discriminator is just slightly above that provided for the speed relay S1. In this way, the anticipation relay is controlled to release at a somewhat higher car speed than is the speed relay S1.

For a car of heavy weight, the switch controlled in accordance with car weight has its movable contacts 155 and 171 both in their H position. Consequently, the tap on potentiometer 156 is then connected through the contact 155 to the movable contact of potentiometer 164. There is a drop-in voltage in passing from the movable tap of potentiometer 164 to wire 160 which subtracts from the voltage appearing at the tap on potentiometer 156. Consequently, the voltage appearing on wire 160, which is the speed relay control voltage for the associated discriminator, is somewhat less than when the switch contact 155 is in its M position for a car of medium weight classification. Accordingly, the speed relay is then controlled to drop away and release the retarder at a somewhat lower car speed, thereby tending to compensate for various factors dependent on car weight that tend to influence the actual leaving speed from the retarder. As before, the voltage applied to wire 170, which is the anticipation relay control voltage, is somewhat higher than the control voltage for the speed relay. With the movable contact 171 also in its H position, the differential in the control voltages for the speed and anticipation relays may be adjusted as desired for heavy cars by controlling the position of the movable tap on the potentiometer 167.

In a similar manner, for a car of light weight classification, the switch contact 155 may be considered as being in its right-hand or L position. Then the movable tap on potentiometer 156 is connected through contact 155 to the movable tap on potentiometer 165. In passing from this movable tap to the wire 160, there is an increase of voltage so that the relay S control voltage is made higher for the light weight car. This results in the releasing of light weight cars at a somewhat higher car speed to provide any compensation required in practice for such lighter cars. The differential between speed and anticipation relay control voltage is now determined by the voltage drop across resistor 166 and that portion of potentiometer 169 extending from its lower terminal to its movable tap. This differential may be adjusted as desired so that the relay A control voltage applied to wire 170 will be the desired amount above the speed relay control voltage appearing on wire 160.

The three-position switch 159 provides for manual adjustment of release speeds for all the retarders of a yard. When this switch is moved from its center or N position to its left-hand or (—) position, the ground of the voltage divider is in effect moved from the junction of potentiometers 157 and 158 to the movable tap of potentiometer 157. This has the effect of decreasing the resistance between ground and the movable tap of the potentiometer 156. This, in turn, results in a reduction of voltage at this tap. Accordingly, the relay S and relay A control voltages are both reduced a slight amount, and this obtains regardless of car weight or any other factor so that the release speeds of all cars are reduced. Operation of this switch contact 159 to its right-hand or (+) position effectively inserts more resistance between ground and the movable tap 156 so that the voltage at this movable tap is increased. Both control voltages for relays S and A are then increased so that they will drop away at somewhat higher car speeds with the result that the speed levels of all cars leaving the hump retarder are raised.

The voltage appearing at the tap of potentiometer 156 is applied directly over wire 172 as a "conditioning" input to the hump discriminator. It is applied to the discriminator in the manner shown in FIG. 3B for the No. 1 group discriminator. Thus, when no car is present so that the check relay 1CK is in its dropped-away condition, the conditioning voltage is applied through back contacts 90 and 91 of the check relay to the cathodes of both diodes 86 and 111. This application of an input to the relay control units even when no car is present means that less of a change is required in operating conditions when a car does appear. Thus, the duration of various transient effects is reduced to a minimum, and the various relays can then be immediately operated in accordance with car speed. Similar inputs are supplied to the group discriminators. The voltage at the tap on potentiometer 154 (see FIG. 5A) is thus applied, for example, over wire 89 to the No. 1 discriminator as shown in FIG. 3B.

The release speed selecting circuits provided for the group retarders are very similar to those just described for the hump retarder. One exception is that the basic voltage divider comprises at all times one of a plurality of additional variable resistors which are selected by the automatic switching circuits in accordance with the route to be taken by a particular car. This effect of the automatic switching circuits has been diagrammatically illustrated by a multi-position switch contact 176 which can be moved to any one of a plurality of different taps dependent upon the route to be taken by the car through the classification yard. The variable resistance corresponding to each route is adjusted to represent conditions over that route. Thus, for a route having considerable curvature or other factors tending to provide extra rolling resistance, the variable resistance is adjusted to provide a relatively large amount of resistance. This has the effect of increasing the resistance between ground and the movable tap of potentiometer 177 with the result that the control voltages for both the speed and anticipation relays are increased. In a similar manner, for a route of low rolling resistance the variable resistor is adjusted to have low resistance so that there is then a decrease of voltage at the tap of potentiometer 177 and a correspondingly lower value of the voltages for the S1 and A1 relays. The leaving speed of each car from the group retarder is thus varied as required to compensate for the particular characteristics of the route it will take. For a double group retarder location, the automatic switching circuits comprise means for transferring route information with each car so that it can be effective on the release speed selecting circuits for the respective retarders successively.

The yard speed manual modifying control which is effective in the manner described on the release speed selecting circuits for the hump retarder is not directly effective on the similar circuits for the group retarder. Instead, this control is made effective on the modifier common to the two group retarders in a manner to be described later and is thus used to affect the output of the modifier so that there is an indirect effect on the control voltages for the relays controlled by the group discriminators.

Both the seelcting circuits for a pair of group retarders comprise three-position switches whose movable contacts 178 and 179 are ganged to operate together. From the manner in which they are included in the voltage dividing circuit organization shown in FIGS. 5A and 5B, it is obvious that they operate in the same manner as does the switch contact 159 associated with the release speed selecting circuits for the hump retarder. Thus, there is a control provided by which the operator may vary slightly in either direction the overall releasing speeds of cars at a particular group location as contrasted with the effect of the yard speed manual modifying control which tends to vary release speeds of all retarders in the yard simultaneously.

*Modifier*

*General description.*—The discriminator provided for the hump retarder does not require an input from an associated modifier since it is desired that all cars leave the hump retarder at the same speed regardless of their rolling characteristics, weight, route, or other factors. At the group retarders, however, the situation is different, and the release speed of each car from the group retarder must be determined on the basis of these different factors. As previously described, the release speed selecting circuits provided for the group retarders compute a desired releasing speed on the basis of car weight and its route through the classification yard, and this computed speed can further be varied within prescribed limits by manual control of the operator. The release speed selecting circuits do not, however, take into account car rolling characteristics; this particular factor is measured by the modifier and applied as a separate input to the group retarder discriminators and is directly effective to raise or lower the release speed already computed by the release speed selecting circuits.

In general, the modifier compares the speeds of each car at the moment it is about to enter the first group retarder of a double retarder location with the speed that a car of average rolling characteristics might be expected to have at that point in its travel. This speed comparison then provides a measure of comparative rollability. More specifically, since all cars are assumed to leave the hump retarder at the same speed, a car having average rolling characteristics may be expected to reach the first group retarder at some particular speed which is arbitrarily termed the "zero modification speed." For this average car, arriving at the predicted speed for such a car, no output is applied from the modifier to the discriminator and the discriminator then allows the car to be released from the group retarder at the speed previously computed by the release speed computing circuits. On the other hand, a car having rolling characteristics different from that of the average car reaches the first group retarder at a speed different from that of the average car. The more its rollability differs from that of the average car, the more its speed of arrival at the first group retarder differs from that of the average car. Therefore, the difference between actual arrival speed and the zero modification speed is determined in the modifier and used as a rollability factor to modify release speed from the group retarders.

The two group retarders at a double retarder location are individually controlled and thus are provided with separate discriminators having their own speed and anticipation relays. The car speeds at which these relays are to be actuated are separately determined as shown by the individual release speed selecting circuits provided for such double group retarders in FIGS. 5A and 5B. Car rollability need be determined only once, however, on the basis of car speed at the entrance to the first of the two group retarders. It is thus necessary that only one modifier be provided for each pair of retarders in a group, but its modifying effect must be capable of being applied to both associated discriminators. This requirement is complicated by the fact that one car or cut may follow another at relatively short intervals through the same group retarders. It is necessary, therefore, that the modifier be able to provide individual modification for the respective cars on the two discriminators simultaneously so that two cars or cuts following each other closely may be accommodated. This is done by providing two individual storages for the computed modifying voltages. The computed modifying voltage is applied first to a first storage and is effective from there to modify the computed releasing speed for the first group retarder. As the car is about to enter the second group retarder, this same modifying voltage is transferred to a second storage, and from there it is effective to modify the releasing speed from the second group retarder of the pair. In the meanwhile, the modifying voltage is retained in the first storage, and it is not cleared out of this storage until the release of the exit relay signifies that the car has left the first retarder. Thus, while the second group retarder is being controlled from the second storage, the first storage is cleared and effective to store a modifying voltage relating to a following car or cut of cars.

*Pulse forming circuits.*—The beat frequency signal obtained from the transmitter-receiver and having its frequency proportional to car speed is continually applied to the modifier. Thus, the output of the cathode follower 33 of FIG. 3A is applied over wire 180 to the clamper 181 included in the modifier as shown in FIG. 3E. The signal is applied through the coupling capacitor 182 and resistor 183 to the cathode of the diode clamping tube 184, and to the grid of tube 188 included in amplifier 189. Resistor 183 and capacitor 185 comprise a low-pass filter that is effective to attenuate transient voltages appearing along with the desired beat frequency signal.

The control grid of tube 188 cannot become more than slightly positive with respect to the grounded cathode of this tube because the diode action between grid and cathode produces a flow of grid current. This grid current would produce a highly negative grid bias if it were not for the action of the clamper tube 184. The plate of the clamping diode 184 is provided with a slightly negative voltage by being connected to the junction of resistors 186 and 187 connected between (B—) and ground. The grid voltage of tube 188 cannot become more negative than this voltage since otherwise the diode 184 becomes conductive. Therefore, even for large input signals, the signal at the grid of tube 188 is prevented from varying over a wide range.

The voltage at the cathode of the clamping diode 184 is applied directly to the control grid of amplifier tube 188 included in the amplifier 189. This additional stage of amplification is provided to ensure that a strong signal will always be supplied to the remainder of the circuits in the modifier. The modifier must determine car rollability from information it receives regarding car speed at the time a car enters the retarder. At such time, the car is still at an appreciable distance from the antenna which is located near the exit end of the retarder. Under certain conditions, the reflected signal may be somewhat erratic; and, for this purpose, it is desired to provide sufficient amplification to ensure that a strong signal is constantly effective on the modifier circuits.

The amplifier 189 is of a conventional class A type and so need not be described in detail. The required negative grid bias voltage for tube 188 is obtained as a result of the flow of grid current produced by driving the grid positive on the positive peaks of the input signal. A capacitor 190 is connected from the plate to the cathode of tube 188 to attenuate somewhat the high frequency response and thus further reduce the effect of any undesired high frequency transient voltages that might be present.

The output of the amplifier 189 obtained from the plate of tube 188 is applied through coupling capacitor 191 to the cathode of the clamping diode 192 included in the clamper 193. This clamper 193 is similar to the clamper 181 already described and is thus also effective to clamp the case line of the amplified beat frequency signal to substantially the value of the negative voltage applied to the plate of diode 192.

The output of the clamper 193 is applied to the input of the squaring amplifier 194. This squaring amplifier 194 and also the pulse gate 195, one-shot multivibrator 196 and amplifier 197 are similar to those provided for each discriminator and shown in detail in FIG. 3A. The function of these circuits is also the same in that they are intended to provide at the output of the amplifier 197 a voltage waveform comprising negative-going voltage pulses of uniform amplitude and width whose frequency equals the frequency of the beat frequency signal.

*Clamper 199.*—The output of the amplifier 197 is applied over wire 198 to the input circuit of a clamper 199. It is in this clamper 199 that the beat frequency signal is, in effect, compared with the voltage corresponding to a speed of zero modification. The cathode of the diode 200 is connected to a source of direct voltage whose value corresponds to the zero modification speed. This voltage is obtained in the manner shown in FIG. 5B. The potentiometers 210, 211 and 212 are connected in series with the upper terminal of potentiometer 210 connected to (B+). The three-position switch contact 213 has its three taps, marked (—), N, and (+), connected, respectively, to the tap on potentiometer 211, the junction of potentiometers 211 and 212, and the tap on potentiometer 212. With switch control 213 of the yard speed manual modifying control in its normal "N" position so as to ground the junction of potentiometers 211 and 212, the tap on potentiometer 210 is adjusted to give a voltage on wire 214 corresponding to the zero modification speed. Moving the control 213 to its (—) and (+) positions inserts less and more resistance, respectively, between the tap on potentiometer 210 and ground. Thus the reference speed can be lowered or raised as desired, and this variation of the reference speed correspondingly varies the release speeds from the group retarders governed by that modifier. An additional ganged switch contact is provided for each modifier in the system so that operation of this control makes it possible to vary simultaneously the release speeds from all the retarders in a yard.

The voltage that is thus applied to the cathode of the diode corresponds to the car speed at which a car of average rollability is expected to arrive at the group retarder. For example, it may be determined that for cars leaving the hump retarder at some particular speed, cars of average rollability will reach the first group retarder at 8 miles per hour which then becomes the zero modification speed. For this expected 8 miles per hour speed, a voltage equal to 8 multiplied by approximately 7.5 or about 60 volts is applied to the cathode of the clamping diode 200. This value of clamping voltage, which is the voltage equivalent of the zero modification speed, establishes the upper limit of the pulse input appearing at the plate of the clamping diode 200. Thus, as the negative-going pulses are continually applied to the plate of this diode, this plate tends between such pulses to rise to the (B+) level since the plate is connected through resistor 215 to the (B+) source. However, the plate cannot rise appreciably above the voltage at the cathode because, if it does, the diode will conduct current and cause a voltage drop across resistor 215. Consequently, the upper limit of voltage at the plate of diode 200 is substantially that of the clamping voltage applied to the cathode, and the negative-going input pulses then cause the plate voltage to vary negatively from this level of clamping voltage by an amount equal to their peak-to-peak amplitude.

*Cathode follower 221.*—The clamped negative-going pulses at the plate of diode 200 are applied through resistor 216 to the grid of the tube 217 included in cathode follower 221. The grid of this tube is connected through an integrating capacitor 218 to ground. This circuit organization results in the charging of capacitor 218 to a voltage which represents the average pulsing voltage at the plate of the clamping diode 200. The various circuit components are preferably chosen so that when the pulse frequency at the plate of the diode 200 in cycles per second equals the value of the clamping voltage on the cathode of diode 200 in volts, the voltage at the grid of tube 217 will be zero volts and zero modification is then provided by the modifier. This means that when car speed equals the zero modification speed, there is a zero input voltage for the grid of tube 217 and zero modification is then effective as will presently become clear. If, however, the car speed exceeds the zero modification speed, the pulse frequency at the plate of diode 200 exceeds the value of the voltage corresponding to zero modification speed. Then more negative charging energy is available to charge capacitor 218 and the grid of tube 217 is driven negative. As another example, an increase in the clamping voltage representing the zero modification voltage raises the average or D.C. level of the pulses at the plate of diode 200. This provides more positive charge to capacitor 218 in any given interval so that capacitor 218 becomes positively charged, driving the grid of cathode follower tube 217 positive.

The balanced condition resulting in zero grid voltage for tube 217 when pulse rate equals clamping voltage is readily obtained by varying the width of the pulses provided by the one-shot multivibrator 196. For example, a test clamping voltage of 60 volts may be applied to the cathode of the clamping diode 200; and, at the same time, a frequency of 60 cycles per second may be applied to the input of the cathode follower 33. With such an input to the cathode follower 33, the one-shot multivibrator 196 provides output pulses at the 60 cycle-per-second frequency and these appear also at the plate of the clamping diode 200. Since the frequency now equals the clamping voltage; it is only necessary to adjust the width of the output pulses provided by the one-shot multivibrator 196 until the voltage at the cathode follower 217 input reaches zero volts.

The cathode of cathode follower tube 217 is connected through series resistors 219 and 220 to the (B—) source of potential instead of to ground. This makes it possible for the output voltage of this tube to be either positive or negative with reference to ground according to the value of the grid input voltage.

Since the cathode of a cathode follower amplifier is always slightly more positive than the grid, the output of the cathode follower tube 217 is taken at the junction of the cathode resistors 219 and 220. The relationship between the values of these two resistors is so chosen that the voltage at their junction substantially equals the grid voltage of the tube. For example, for a grid voltage of zero volts such as occurs when the beat frequency equals the clamping voltage, the voltage at the junction of resistors 219 and 220 also equals zero volts although the voltage at the cathode of tube 217 may actually be a few volts positive.

*D.C. amplifier.*—The cathode follower 221 thus provides an output voltage that is directly proportional to the amount by which the car speed differs from the expected speed of arrival at the first group retarder of a car of average rolling characteristics. Although this difference of voltage could conceivably be used directly to modify the release speed from the group retarder, it is instead passed through a multiplying amplifier so that an output voltage is provided that represents the difference voltage multiplied by some predetermined factor. This resulting multiplied voltage is then applied to the discriminator to affect leaving speed from the group retarder. The multiplication of the difference voltage by the multiplying amplifier is necessary in order that the measured difference in rollability between cars may be made effective to the extent desired to modify releasing speed from the group retarder. Thus, depending upon conditions, it may be necessary that a detected difference between actual entering speed and the zero modification speed of one mile per hour, for example, cause as much as a four mile per hour variation in the releasing speed from the group retarders. The degree of effectiveness provided by the modifier can thus be readily selected by the choice of multiplication used in the multiplying amplifier. The output voltage of the cathode follower 221 is applied to a direct-current amplifier 222. The direct-current amplifier 222 comprises triode amplifier tube 223 and cathode follower tube 230. Tube 223 is supplied with a fixed bias voltage by having its cathode connected to the junction of the voltage dividing resistors 225 and 226 connected between (B+) and ground. The grid of tube 223 is connected to ground through resistor 227. The input voltage for the tube is applied to the grid through resistor 228. The inverted output voltage, which is obtained from the plate, is supplied through a resistor 229 to the control grid of cathode follower tube 230. The output of tube 230 is obtained from the junction of resistors 236 and 237.

A feedback connection is provided from the cathode of tube 230, through variable resistor 231, to the grid of the D.C. amplifier tube 223. By making the gain of the amplifier stage including tube 223 large, the over-all gain of the D.C. amplifier becomes a function of the circuit constants of the feedback network and is substantially independent of tube aging or variations in tube characteristics. Consequently the voltage at the cathode of tube 230 "follows" the voltage on wire 224 except for a multiplying factor dependent upon the value of the variable feedback resistor 231. When the value of the feedback resistor is made large so that the feedback is reduced, the gain of the D.C. amplifier is at a maximum so that a relatively small input to the direct-current amplifier results in a much larger output from the amplifier tube 230. Conversely, reducing the value of the feedback resistor 231 to increase the negative feedback causes a reduction in gain to the D.C. amplifier so that a given input voltage to tube 223 causes a much smaller level of output voltage of the amplifier tube 230. It has been found in practice that a D.C. amplifier capable of multiplying its input by a factor variable over the approximate range of one to four will provide the desired modifying voltage under all conditions.

The D.C. amplifier 222 not only multiplies the input voltage by a predetermined factor but also inverts it. A negative charge on capacitor 218, such as results when the pulse frequency at the plate of tube 200 exceeds the voltage corresponding to zero modification speed, produces a negative input voltage to the grid of tube 223. The output voltage on wire 235 is then of positive polarity. In a similar way, a positive voltage on the grid of tube 217 results in a negative voltage on wire 235. In effect, therefore, whenever car speed exceeds the zero modification speed, a positive modifying voltage results; conversely, whenever car speed is below the zero modification speed, a negative modifying voltage results.

Various circuit components in the D.C. amplifier 222 are selected so that the voltage appearing on the cathode of tube 230 follows the input voltage on wire 224 except for the multiplying effect introduced by the D.C. amplifier 222. Potentiometer 226 is adjusted in value so that the voltage at the cathode of tube 230 will be zero at such times that car speed equals the zero modification speed and produces a zero voltage on wire 224.

*Electronic switches 238.*—Although the modifier unit continually receives information as to car speed, the rollability characteristics of a car must be determined on the basis of car speed existing at a particular instant as the car reaches a predetermined point, which point then establishes the end of the test section. This predetermined point is reached when a car's first truck actuates the weighing device positioned just ahead of the first group retarder. At that time, the check relay 1CK picks up as will later be described, and this causes the electronic switches 238 to "sample" momentarily the voltage appearing on wire 235 and store this voltage in capacitor 239. The capacitor 239 comprises the storage device for holding the modifying voltage for the first discriminator throughout the time the car is in the first group retarder.

The electronic switches 238 are, in effect, closed for charging at the instant the check relay 1CK is picked up by the approaching car so that the storage capacitor 239 can quickly charge to the particular value of modifying voltage then appearing on wire 235. The electronic switch is closed only for a very brief interval so as to "sample" the voltage on wire 235 only momentarily and then opens again, but the storage capacitor 239 retains its charge so that the stored modifying voltage can be continually effective on the No. 1 discriminator as the car passes through the corresponding No. 1 group retarder.

While the car is still in the No. 1 group retarder, the exit relay 1EX associated with this retarder picks up. As will be described, this establishes a pick-up circuit for the check relay 2CK associated with the No. 2 group retarder. As soon as relay 2CK picks up, the voltage value stored in capacitor 239 is, in effect, transferred through the electronic switches 244 to another storage capacitor 245. From here, this voltage is effective to control the No. 2 discriminator. The modifying voltage thus moves with the car and is effective on the No. 2 discriminator as the car passes through the No. 2 retarder to modify the release speed from the second retarder.

As the car leaves the first retarder, the electronic switches 238 are momentarily closed to discharge the storage capacitor 239. This leaves the first storage free to accept a modifying voltage for a following car.

The electronic switches 238 include the tubes 240 and 241 for charging capacitor 239, and these tubes have their grids connected in parallel and with their plate-cathode circuits connected back-to-back. The two triode tubes 242 and 243 for discharging capacitor 239 are similarly connected. The two tubes 242 and 243 are normally maintained in conductive conditions as will be described and are thus effective to maintain the capacitor 239 normally in a nearly discharged condition. At the instant it is desired to "look" at the computed modifying voltage and store this voltage in capacitor 239, the discharging switch tubes 242 and 243 are made nonconductive and the normally non-conductive switch tubes 240 and 241 are made conductive. This causes the particular modifying voltage then appearing on wire 235 to charge capacitor 239 to the same value of voltage. Two triode tubes are provided rather than one and are connected back-to-back so that capacitor 239 can be properly charged by either a negative or a positive modifying voltage.

The discharge switch tubes 242 and 243 have their control grids connected through resistor 260 to the junction of voltage dividing resistors 233 and 234 connected between (B+) and (B−). This voltage divider provides a bias voltage on the grids of these tubes that conditions them to be conductive. The cathode of tube 242 and plate of tube 243 are both connected to the junction of the resistors 248 and 249 connected between (B−) and ground so as to hold them at a slightly negative potential. Under quiescent conditions, therefore, when tubes 242 and 243 are biased to be conductive, capacitor 239, although substantially discharged is slightly negative at its upper terminal with respect to ground. This compensates for the usual positive cathode bias of tube 246 and gives a zero modifying voltage at the cathode of this tube when no car is present.

The control grids of the charging switch tubes 240 and 241 are normally connected through resistor 250 and the resistor 251 to (B−). This connection makes the grids of both these tubes so far negative in potential that neither tube can be conductive. As an approaching car reaches the weight detector so that the check relay 1CK can pick up, front contact 258 of relay 1CK closes to connect wire 259 directly to (B−). This biases both tubes 242 and 243 to nonconductive conditions to thereby render the discharging circuits for capacitor 239 ineffective during the time the car is in the No. 1 retarder so as to hold the check relay picked up. At the same time, a charged capacitor 252 shown in FIG. 3D suddenly has its positive upper terminal connected through front contact 253 of relay 1CK, to wire 254, and through resistors 255 and 250 to the control grids of the two charging switch tubes 240 and 241. The manner in which the capacitor 252 is normally provided with this positive charging voltage will subsequently be described; however, the connection of this charged capacitor 252 to the grids of the switch tubes 240 and 241 results in their being made momentarily conductive. This conductive condition lasts only for about one-half second, however, as the capacitor 252 quickly discharges. During this half-second interval, the voltage on wire 235 charges the storage capacitor 239 to substantially the same voltage level through either switch tube 240 or switch tube 241 depending upon whether the modifying voltage at that particular instant is of positive or negative polarity, respectively.

Circuit means is associated with the electronic switches 238 that automatically prevents the modifier from varying release speeds when a long cut is detected as passing through the associated group retarder. This means comprises a long cut detector which, in the embodiment shown in FIGS. 3E and 3F, includes a circuit from (B−), through front contact 265 of check relay 1CK and back contact 266 of track relay TR to the junction of resistors 250 and 251. As shown in FIG. 2, actuation of track relay TR indicates occupancy of a short track section in advance of the No. 1 group retarder. The separation between this track section and the weighing rail associated with weight detector 17 is such that only a long cut of cars can simultaneously actuate both the weight detector 17 and the track relay TR. When this does happen, however, (B—) voltage is applied over the circuit described above to the junction of resistors 250 and 251. This highly negative voltage prevents the grids of tubes 240 and 241 from being driven above cutoff when relay 1CK picks up. As a result, the capacitor 239 cannot change to the voltage appearing on wire 235, and no modification is provided for such long cuts.

Various other means may be provided for the detection of long cuts; the means illustrated in FIGS. 3E and 3F is shown merely to illustrate the principle. One such alternate means of detecting the presence of long cuts is disclosed in the case of R. F. Albrighton Ser. No. 513,321, filed on the same date with the present application, which has resulted in patent No. 2,814,996.

*Cathode follower 247.*—Since capacitor 239 is in the grid-cathode circuit of cathode follower tube 246, the voltage to which this capacitor is charged controls the conduction level of this tube. The cathode of tube 246 is connected through resistors 255 and 256 to (B—), while the plate is connected to a positive source of potential; therefore, the cathode can assume either positive or negative voltages with respect to ground, depending entirely upon the voltage across the storage capacitor 239. To compensate for the fact that the cathode of tube 246 is slightly positive with respect to its grid, capacitor 239 is charged with a voltage that is slightly less than the desired modifying voltage. This is accomplished by obtaining the charging voltage for capacitor 239 from the junction of resistors 236 and 237 rather than directly from the cathode of tube 230. As an example, for a zero modifying voltage on the cathode of tube 230, the voltage on wire 235 is slightly negative, charging capacitor 239 to this same negative voltage. The grid of tube 246 is then slightly negative, but the cathode is at substantially the desired zero volts so that the proper modifying voltage is applied to the No. 1 discriminator.

*Electronic switches 244.*—As the car passes through the first retarder, but before it passes out of the first retarder, the check relay 2CK associated with the No. 2 discriminator is picked up. When this happens, the charged capacitor 270 is connected through front contact 272 of relay 2CK to wire 273 and causes the normally cut-off grids of tubes 274 and 275 to become momentarily raised in potential so that one or the other of these tubes can conduct and charge the second storage capacitor 245 to the value of voltage appearing on wire 276. At the same instant, the picking up of relay 2CK connects wire 277 to (B—) through front contact 278 of this relay so that the grids of the discharging switch tubes 279 and 280 are driven so far negative that neither tube can possibly conduct. Consequently, the picking up of relay 2CK causes the storage capacitor 245 provided for the No. 2 discriminator to become charged to a voltage that represents the modifying voltage desired to be made effective on the No. 2 discriminator. This charge controls the level of conduction of the cathode follower 281 so that the desired modifying voltage appears on the output wire 282 connected to the cathode of tube 283 and is applied over this wire to the speed and anticipation relay control circuits of the No. 2 discriminator.

The voltage on wire 276 is obtained from the junction of resistors 255 and 256 rather than directly from the cathode of tube 246. Also, capacitor 245 is charged slightly negative under quiescent conditions because of the negative voltage appearing on the cathode of tube 279 and plate of tube 280. Both these factors compensate for the fact that the output voltage of cathode follower 281 appearing on wire 282 is somewhat higher than the grid voltage of this tube. Therefore, the modifying voltage for the No. 2 discriminator appearing on wire 282 very closely approximates the corresponding modifying voltage for the No. 1 discriminator that previously appeared on wire 276.

As a car leaves the first retarder, the exit relay 1EX of the No. 1 discriminator is released so that the check relay 1CK also drops away. As a result, the discharging switch tubes 242 and 243 both have their grids raised abruptly in voltage because the open front contact 258 of relay 1CK disconnects wire 259 from the (B—) source, and establishes the normal positive bias on the grids of these tubes. With both tubes 242 and 243 now conditioned by their grid voltage to be conductive, capacitor 239 can discharge through either tube 242 or tube 243, depending upon the polarity of its charge. In a similar way, the exit of the car from the second retarder of the group results in the dropping away of relay 2CK. Thus, quiescent conditions are re-established with zero modifying voltages being provided by the modifier to the two associated discriminators.

*Voltage sampling circuit.*—As previously explained, the picking up of check relay 1CK as a car approaches the No. 1 group retarder causes a charged capacitor 252 to be connected in the grid circuits of the charging switch tubes 240 and 241. The charging of this capacitor 252 as well as the similar capacitor 270 provided for the switch tubes 274 and 275 is accomplished by the voltage sampling circuit 285. This circuit organization provides a means for charging these capacitors that is dependent upon the continued reception of pulses from the amplifier 197 shown in FIG. 3E. Consequently, these capacitors cannot become charged and thereby make their associated switch tubes momentarily conductive if there is any breakdown in any of the apparatus provided for the production of the output pulses from amplifier 197.

The output pulses obtained from the amplifier 197 are negative-going pulses of uniform width and amplitude, whose frequency is proportional to car speed. These pulses are applied through resistor 286 and capacitor 287 to the plate of tube 288 and the cathode of tube 289. Tube 288 has its control grid connected through resistor 290 to the plate of this tube so that this tube operates as a diode. The cathode is connected directly to ground; therefore, the incoming pulses cannot cause the plate of this tube to rise appreciably above ground level since this would result in the conduction of tube 288 and produce a voltage drop across resistor 286. Therefore, tube 288 acts as a clamping diode that is effective to limit the upper level of the negative-going pulses to approximately ground level.

In the absence of input pulses from amplifier 197, tube 291, which has its cathode connected directly to (B—), is fully conductive because its control grid is provided with a voltage above (B—) by being connected through resistors 292 and 293 to the junction of voltage dividing resistors 294 and 295 which are connected in series between (B—) and ground. Under normal conditions, therefore, tube 291 is fully conductive, and the resulting voltage drop through the plate resistor 296 causes the plate voltage to be substantially negative with respect to ground. Thus, in the absence of pulses from amplifier 197, capacitors 252 and 270 cannot become positively charged.

The negative-going pulses appearing at the cathode of tube 289 reduce the cathode potential of this tube below that of its plate so that this tube conducts and negatively charges capacitor 297. When these pulses are continually received, they charge capacitor 297 negatively to a sufficient extent that the grid voltage of tube 291 is lowered to a level where this tube becomes cut off. When this occurs, the plate voltage of tube 291 rises, but is limited to a desired predetermined value by the connection of the plate to the junction of voltage dividing resistors 296 and 298 connected in series between (B+) and ground. This voltage at the plate of tube 291 is then applied over wire 299 to charge the capacitors 270 and 252 through back contacts 272 and 253 of the check relays 2CK and 1CK respectively. Thus, it is only when the required negative-going pulses from amplifier 197 are continuously being applied to the voltage sampling circuit 285 that these capacitors 270 and 252 can become positively charged and render their associated charging switch tubes momentarily conductive.

*Effect of modifying voltage.*—The modifying voltage computed for each car or cut of cars is applied to both the speed relay control circuit and the anticipation relay control circuit for a discriminator and directly affects the car speed at which these relays are released. As described previously, the wire 102 shown in FIG. 3B is connected to ground for the discriminator associated with the hump retarder. When the discriminator is associated with a group retarder, however, this wire 102 is not grounded but instead has applied to it a modifying voltage from the associated modifier. By means of this connection, the modifying voltage is applied to the cathode circuits of tubes 97 and 109.

While the car speed is above the speed at which the S1 and A1 relays release, the voltage on wire 102 is applied to the cathode of tube 97 through resistor 105. Since the value of this modifying voltage thus directly affects the grid-cathode voltage of tube 97, it is equally as effective as the grid voltage in determining the level of conduction of this tube. Because a variation of voltage on the grid of approximately 7.5 volts represents a speed change of one mile per hour in the previously mentioned embodiment of this invention, each 7.5 volts of modifying voltage is similarly effective to vary by one mile per hour the car speed at which relay S1 releases.

A positive modifying voltage appears on wire 102 when a car has easy rolling characteristics as already described. This positive modifying voltage causes tube 97 to become conductive with a somewhat higher voltage on its grid, representing a lower beat frequency and thus a lower car speed. Therefore, tube 99 becomes cut off and releases relay S1 at this lower car speed also. This tends to compensate for the easy rolling characteristics of the car. A car of hard rolling characteristics provides a negative modifying voltage on wire 102, and it will be understood by analogy from the preceding description that this will cause relay S1 to release for a higher car speed to compensate for the harder rolling characteristics of this car.

The modifying voltage on wire 102 is effective in the same way on the anticipation relay control circuit 110 so that the car speed at which relay A1 is released can in the same way compensate for the rolling characteristics of the car.

Figure 7:
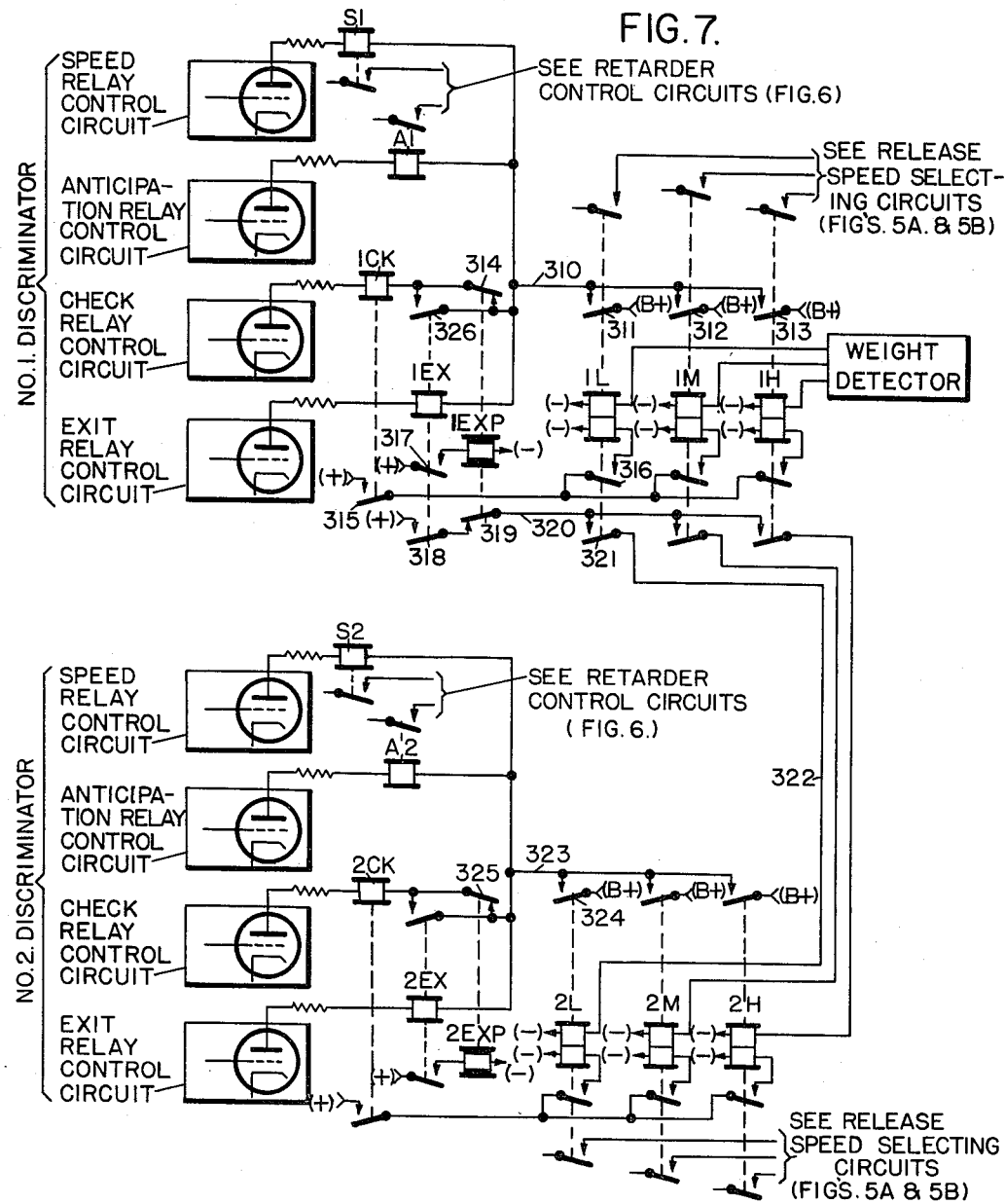
FIG. 7 illustrates a typical organization of the relay circuit means of this invention.

*Relay circuits.*—FIG. 7 illustrates the relay circuit organization that may be provided for the retarder control system of this invention. Although the circuits shown are more particularly those provided for a double group retarder location, they also apply to the control of the relays associated with the single retarder that may be provided at a hump location.

Although the tubes provided, respectively, for the control of the S1, A1, 1CK, and 1EX relays may all be conditioned to be conductive, pick-up circuits for these relays cannot be completed unless one of the weight storage relays is picked up. Either relay 1L, 1M, or 1H must be picked up by passage of the first axle of a car over the weight detector in advance of the retarder in order that energy can appear on wire 310 through one or more of the closed front contacts 311, 312, or 313 of these weight storage relays. Since the check relay is controlled to be picked up in response to a reflected signal of weak amplitude, this relay picks up immediately when energy appears on wire 310. Since the exit repeater relay 1EXP is dropped away at this time, the winding of relay 1CK is energized from the now energized wire 310 through closed back contact 314 of the relay 1EXP. Consequently, the check relay becomes picked up at the instant the weight detector is actuated by the first wheel of a car.

The picking up of the check relay 1CK results in the establishing of a stick circuit for whichever of the weight storage relays was picked up by the weight detector. For a car of light weight, for example, causing the picking up of relay 1L, a stick circuit is completed through front contact 315 of relay 1CK and through front contact 316 of relay 1L. In this way, the weight information concerning a car is held in the weight storage relay throughout the time that the check relay is maintained in its picked up condition. Since the speed and anticipation relays S1 and A1, respectively, are also organized to operate in response to reflected signals of relatively weak amplitude, these relays are also picked up ordinarily prior to the entry of the car into the car retarder. Of course, these relays will pick up only provided that the car speed is at that time above the release speeds for these relays.

The exit relay 1EX is controlled by the exit relay control circuit to pick up this relay only when the reflected signal is of large amplitude, indicating that the car is relatively close to the antenna. When this relay 1EX picks up, it establishes a circuit through its front contact 317 to pick up its repeater relay 1EXP. This relay is provided with both slow release and slow pick up characteristics. Consequently, there is a brief interval after the picking up of relay 1EX and before the picking up of its repeater relay 1EXP that a circuit is completed through front contact 318 of relay 1EX and back contact 319 of relay 1EXP resulting in the placing of (+) energy on wire 320. During this brief interval, the weight information stored in the weight storage relays is transferred to the similar relays provided for the second retarder of the group. For example, for a car of light weight which causes the picking up of relay 1L, a circuit is completed at this time from the now energized wire 320 and through front contact 321 of relay 1L, wire 322 and through the upper winding of relay 2L, to (−).

As soon as relay 2L picks up, energy is applied to wire 323 through front contact 324 of relay 2L. This makes it possible for relay 2CK to pick up through closed back contact 325 of relay 2EXP. As with the relay circuits provided for No. 1 discriminator, the picking up of relay 2CK establishes a stick circuit for the energized weight relay so that the weight information is retained while the car is in the retarder.

When a car leaves the retarder so that the exit relay 1EX drops away, the energizing circuit for the associated repeater relay is opened so that this relay, after a brief interval resulting from its slow release characteristics, also drops away. In the interval following the dropping away of relay 1EX but before the repeater relay 1EXP can drop away, front contact 326 of relay 1EX is open as is also back contact 314 of relay 1EXP. As a result, the check relay 1CK is deenergized and dropped away. When this occurs, the opening of front contact 315 of relay 1CK deenergizes whichever of the weight storage relays has been picked up. With all these relays released, energy can no longer appear on wire 310 so that all the relays associated with the No. 1 discriminator are released to thereby restore the relay circuit organization to its normal condition. The relays associated with the No. 2 discriminator are released in the same manner when the car passes out of the second retarder of the group.

*Retarder control*

FIG. 6 illustrates the manner in which the retarder operating mechanism may be selectively controlled in accordance with the conditions of the various relays. When there is no car in, or immediately in approach of, a retarder so that the check relay is dropped away, the repeater relay 1CKP associated with the check relay is also dropped away. Consequently, a circuit is then completed from (+), through back contact 327 of relay 1CKP and over wire 328 to the input wire 4 of the retarder operating mechanism. The application of electrical energy to this particular wire causes the retarder to assume a fully closed position.

When the car approaches the retarder so that the relay 1CK is picked up, the repeater relay 1CKP also picks up and results in the application of energy from (+) through front contact 327 of relay 1CKP to wire 329. If the speed relay S1 is picked up at this time, as would normally be the case, indicating that car speed is above the release speed from the retarder, energy is then applied from wire 329, through front contact 330, to wire 331.

The position to which the retarder operating mechanism is operated is dependent upon car weight since a heavy car requires a greater braking effect than does a light car. For a car detected as being of heavy weight classification by the weighing device, relay 1H is picked up. Under these circumstances, energy is then applied from wire 331 through front contact 332 to wire 333. Normally, the car speed would, upon entry of the car in the retarder, be above the speed at which the anticipation relay A1 drops away. Therefore, the energy appearing on wire 333 would be applied through front contact 334 to wire 335. This results in the energization of the No. 4 input wire of the retarder operating mechanism so that the retarder is operated for the heavy car to its fully closed position. As the heavy car is decelerated by the retarder, its speed eventually reaches the predetermined speed for which the anticipation relay is controlled to drop away. When this occurs, front contact 334 of relay A1 is opened so as to remove energy from the input wire 4. At this time, the back contact 334 closes so as to energize the input wire 3. This results in the partial opening of the retarder. When the car speed has been further reduced to the level at which the speed relay S1 is to operate, back contact 330 of relay S1 closes and energizes the input wire zero of the retarder operating mechanism. This results in the retarder being operated to its fully released position.

By analogy with this description, it is evident that with car speed above the releasing speeds for the A1 and S1 relays, the retarder operating mechanism is controlled to apply braking pressure in accordance with the weight as determined by the conditions of relays 1H, 1M and 1L. Upon the operation of the anticipation relay A1, the retarder is partially opened so as to decrease the braking effect on the car. Finally, when car speed has been further reduced to substantially the desired leaving speed from the retarder, the relay S1 drops away and the retarder is then fully opened.

Having described an automatic retarder control system as one embodiment of this invention, we desire it to be understood that this form has been selected merely to illustrate a particular embodiment and manner of operation, and that various modifications and adaptations can be made to meet the requirements of practice without departing in any manner from the spirit or scope of this invention.

What we claim is:

1. In a control system for a railroad car classification yard, a test section of sloping railway track interposed between spaced car retarders, control means for each of said retarders to vary the braking effect of said retarder upon cars being accelerated by gravity over said test section and through said retarders, speed measuring apparatus providing an output proportional to the speed of each car at the exit end of said test section, circuit means acting upon said control means associated with said retarder at the entrance end of said test section to release each car at a preselected uniform speed, modifier circuit means governed by said speed measuring apparatus and providing a continuously variable output proportional for each car to the difference between its actual speed at the exit end of said test section and the expected speed at said exit end of a car of known rolling characteristics, whereby the output of said modifier provides a measure of the rolling characteristics of said car as compared to the rollability of said car having known rolling characteristics, and circuit means governed by the output of said modifier and acting upon said control means associated with said retarder at the exit end of said test section to release each car from said exit end retarder at a speed selected in accordance with its rolling characteristics.

2. In a car retarder control system, a stretch of track including a car retarder, radar speed measuring apparatus comprising an antenna positioned near the exit end of said retarder and directing a beam of high frequency energy toward approaching cars, said apparatus being effective to provide a beat frequency signal having its amplitude substantially proportional to the proximity of said car to said antenna while approaching said antenna but decreasing abruptly to a low value as said car recedes from said antenna, an exit relay, an electron tube amplifier governed by said beat frequency signals for actuating said exit relay when the amplitude of said beat frequency signal exceeds a predetermined level, circuit means including a capacitor being rendered active by the initial actuation of said exit relay and acting upon said amplifier to fully energize said exit relay for a limited time irrespective of the then existing amplitude of said beat frequency signal, whereby the premature release of said exit relay in response to a decrease in amplitude of said beat frequency signal occurring immediately after the actuation of said relay is prevented.

3. In a car retarder control system, a stretch of track including a car retarder to provide a controllable braking pressure upon moving railway cars, radar speed measuring apparatus providing a beat frequency signal proportional in frequency to the speed of each car passing over said stretch of track and through said retarder and comprising, a pulse gate including a grid controlled electron tube, pulse forming circuit means receiving said beat frequency signal through said pulse gate and being effective to provide an output pulse of uniform width and amplitude for each cycle of said beat frequency signal, circuit means governed by said pulse forming circuit means and acting upon said grid of said electron tube to make said pulse gate ineffective for a limited time following each output pulse provided by said pulse forming circuit means to feed said beat frequency signal to said pulse forming circuit means, relay circuit means being selectively controlled according to the frequency of said pulse provided by said pulse forming circuit means, and means governed by said speed measuring apparatus to release said braking effect when the speed of each car is reduced to a predetermined level for said car, whereby spurious inputs occurring at higher rates than said beat frequency signal are prevented from being applied to said pulse forming circuit means.

4. In a car retarder control system, a stretch of track including a car retarder, speed measuring apparatus for transmitting a high frequency signal toward cars passing over said stretch of track and for receiving a return signal reflected from each car with a change in frequency proportional to car speed, circuit means for providing a beat frequency signal having its frequency equal to the difference in frequency between said transmitted and said reflected signals and with its amplitude dependent upon the amplitude of said reflected signal, an exit relay, control circuit means for said exit relay including an electron tube amplifier being effective to energize said relay when the amplitude of said reflected signal exceeds a predetermined value, circuit means responsive to the opening of a back contact of said relay upon its first being actuated to provide a positive feedback for said amplifier to thereby immediately increase the energization of said relay provided by said amplifier, whereby fluttering of said relay upon its actuation is prevented.

5. In a control system for a railroad car classification yard, a section of railway track including a car retarder, radar speed measuring apparatus for measuring the speed of a car passing over said section in accordance with a beat frequency signal having its frequency proportional to the speed of said car and comprising, a check relay for indicating when actuated the presence of a car, an electron tube amplifier responsive to the amplitude of said beat frequency signal for energizing said check relay, a capacitor being charged in accordance with the amplitude of said beat frequency signal for determining the input level of said amplifier, charging circuit means for said capacitor including a grid controlled charging tube, said charging tube being effective to charge said capacitor by said beat frequency signal through the plate-cathode circuit of said charging tube, said capacitor being included in the grid-cathode circuit of said charging tube and becoming effective when charged to a predetermined value to drive said charging tube toward cutoff, whereby the variation of charge on said capacitor for large variations in amplitude of said beat frequency signal is limited to thereby prevent said capacitor from remaining charge for a prolonged interval after said beat frequency signal diminishes in amplitude.

6. In a control system for a railroad car classification yard, a test section of sloping railway track in advance of a double group retarder comprising two adjoining car retarders, control means for each of said retarders to vary their braking effect upon cars being accelerated by gravity over said test section of track and through said retarders, modifier circuit means responsive to the acceleration of each car over said test section and effective to provide a continuously variable rollability factor proportional for each car to its comparative rolling characteristics, said modifier circuit means comprising separate storage means for each retarder to store said rollability output for each car, means associated with each of said retarders and responsive to the approach of a car to the associated retarder to store said rollability factor in the associated storage means, means associated with each retarder and responsive to the exit of a car from the associated retarder to clear out the associated storage means, speed measuring apparatus associated with each retarder to measure the speed of each car passing through said retarder, and circuit means associated with each retarder and governed jointly by its respective speed measuring apparatus and by the rollability factor in the corresponding storage means for releasing each car at a particular speed in accordance with its rolling characteristics.

7. In a car retarder control system, a test section of track in advance of a car retarder, control means for said retarder to control its braking effect upon moving cars, speed measuring apparatus providing an output continuously proportional to the speed of a car passing through said section of track, circuit means governed by said speed measuring apparatus for providing a continuously variable output voltage proportional for each car to the difference between its speed and the speed expected of a car at the end of said test section having known rolling characteristics, a storage capacitor, means including a normally cutoff grid controlled charging tube for charging said capacitor with said output voltage, said charging tube being made momentarily conductive by the arrival of a car at the end of said test section to thereby charge said capacitor to a voltage proportional to the average acceleration of said car over said test section, circuit means including a grid controlled discharge tube for discharging said storage capacitor when said car exits from said retarder, said capacitor thereby being conditioned to again receive a charge for a following car, and means governed by the voltage across said capacitor for controlling the car speed at which said car retarder will be operated to an open position.

8. In a car retarder control system, a test section of railway track including a car retarder, control means for said retarder to control the speed of cars passing over said test section of track and through said retarder, speed measuring apparatus for continually providing an output proportional to the speed of each car, modifier means governed by said speed measuring apparatus to provide an output proportional to the acceleration of each car rolling by gravity over said test section, release speed control circuit means governed jointly by said modifier and by said speed measuring apparatus to release each car from said retarder at a speed selected in accordance with its acceleration over said test section, and means responsive to the passage of a multiple car cut exceeding a predetermined number of cars over said test section for rendering ineffective the output of said modifier upon said release speed control circuit means.

9. A car retarder control system comprising in combination, a stretch of railway track including a car retarder, selectively operable to braking and non-braking positions, retarder control means for said retarder operable to maintain the retarder in a braking position only until the speed of a car within the retarder is reduced to a selected release speed, long cut detection means associated with the railway track in approach of the car retarder for detecting multiple car cuts, said detection means being operated to one condition for single car cuts and to another condition for multiple car cuts, and circuits means for selecting different release speeds for said retarder in dependence upon whether said long cut detection means is in said one condition or said another condition.

10. Control apparatus for a car retarder, comprising, in combination, means for measuring the rolling resistance of cuts of cars below a given length, means for storing an average value of rolling resistance for cuts above said given length, means for computing the desired leaving speed of a cut of cars from said retarder in dependence on the rolling resistance of said cut, means for measuring the length of each cut in approach of said retarder, means controlled by said length measuring means for supplying said measured value or said average value of rolling resistance to said computing means according as the length of each cut is above or below said given length, and means responsive to the output of said computing means for controlling the braking force exerted by said retarder on each cut to reduce its speed to said computed value.

References Cited by the Examiner
UNITED STATES PATENTS

| | | | |
|---|---|---|---|
| 2,361,466 | 10/44 | Fitzsimmons | 246—182 |
| 2,814,996 | 12/57 | Albrighton | 246—182 |
| 3,100,098 | 8/63 | Crawford et al. | 246—182 |

EUGENE G. BOTZ, *Primary Examiner.*